US012777537B2

(12) United States Patent
Da Silva et al.

(10) Patent No.: US 12,777,537 B2
(45) Date of Patent: Oct. 27, 2026

(54) SYSTEMS AND METHODS FOR MASTER NODE-INITIATED CONDITIONAL PRIMARY SECONDARY CELL ADDITION

(71) Applicant: Telefonaktiebolaget LM Ericsson (PUBL), Stockholm (SE)

(72) Inventors: Icaro Leonardo Da Silva, Solna (SE); Cecilia Eklöf, Täby (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 723 days.

(21) Appl. No.: 18/040,283

(22) PCT Filed: Aug. 6, 2021

(86) PCT No.: PCT/IB2021/057270

§ 371 (c)(1),
(2) Date: Feb. 2, 2023

(87) PCT Pub. No.: WO2022/029712

PCT Pub. Date: Feb. 10, 2022

(65) Prior Publication Data

US 2023/0363027 A1 Nov. 9, 2023

Related U.S. Application Data

(60) Provisional application No. 63/062,354, filed on Aug. 6, 2020.

(51) Int. Cl.
*H04W 76/15* (2018.01)
*H04W 76/20* (2018.01)

(52) U.S. Cl.
CPC .......... *H04W 76/15* (2018.02); *H04W 76/20* (2018.02)

(58) Field of Classification Search
CPC ..... H04W 76/15; H04W 76/20; H04W 36/18; H04W 36/362
See application file for complete search history.

(56) References Cited

U.S. PATENT DOCUMENTS

2009/0232097 A1 9/2009 Taneja
2021/0051749 A1 * 2/2021 Adusumilli ........... H04W 76/34
(Continued)

FOREIGN PATENT DOCUMENTS

CN 106664622 A 5/2017
CN 111316695 A 6/2020

OTHER PUBLICATIONS

Qualcomm Incorporated, "Conditional NR PSCell addition/change procedures", 3GPP TSG-RAN WG2 Meeting #107bis, R2-1912297 (Year: 2019).*
(Continued)

*Primary Examiner* — Ayaz R Sheikh
*Assistant Examiner* — Mang Boi Thawng

(57) ABSTRACT

A method by a network node operating as a Master Node (MN) for conditional Primary Secondary Cell Addition (CPA) includes sending, to a target secondary node (SN) a Request message. The network node receives, from the target SN, an Acknowledge message comprising an RRC Reconfiguration message (RRCReconfiguration**), including a Secondary Cell Group (SCG) configuration for a target candidate cell. The network node sends, to a wireless device, another RRC Reconfiguration message (RRCReconfiguration), which includes at least one conditional reconfiguration. The conditional reconfiguration includes: another RRC Reconfiguration message (RRCReconfiguration*) in MN format and a Master Cell Group (MCG) configuration; at least one execution condition for the CPA; and a conditional reconfiguration identity associated with the CPA for the target candidate cell. The RRCReconfiguration* includes
(Continued)

the RRCReconfiguration**. The network node receives, from the wireless device, a first reconfiguration complete message.

19 Claims, 13 Drawing Sheets

(56) References Cited

U.S. PATENT DOCUMENTS

| | | | | |
|---|---|---|---|---|
| 2022/0046495 | A1* | 2/2022 | Lee | H04W 36/362 |
| 2022/0116803 | A1* | 4/2022 | Yan | H04B 17/327 |
| 2022/0369172 | A1* | 11/2022 | Hwang | H04W 36/0079 |
| 2023/0085746 | A1* | 3/2023 | Wu | H04W 24/10 370/331 |
| 2023/0103163 | A1* | 3/2023 | Xu | H04W 36/0016 370/331 |
| 2023/0111427 | A1* | 4/2023 | Zhang | H04W 16/26 370/331 |
| 2023/0171652 | A1* | 6/2023 | Zhang | H04W 36/0061 370/331 |
| 2023/0262540 | A1* | 8/2023 | Kim | H04W 36/362 370/216 |
| 2023/0363026 | A1* | 11/2023 | Futaki | H04W 76/15 |
| 2024/0056917 | A1* | 2/2024 | Kim | H04W 36/0058 |

OTHER PUBLICATIONS

Qualcomm Incorporated, "On conditional PSCell addition/change", 3GPP TSG-RAN WG4 Meeting #94-e, R4-2000725 (Year: 2020).*

CATT, "Conditional PScell addition/change", 3GPP TSG-RAN WG2 Meeting #107bis, R2-1912133 (Year: 2019).*

Vivo, "Remaining issue of conditional PSCell addition and change", 3GPP TSG-RAN WG2 Meeting #108 R2-1914703 (Year: 2019).*

ETSI TS 138 331 V16.1.0; 5G; NR; Radio Resource Control (RRC); Protocol specification (3GPP TS 38.331 version 16.1.0 Release 16)—Jul. 2020.

PCT Notification of Transmittal of the International Search Report and the Written Opinion of the International Searching Authority, or the Declaration issued for International application No. PCT/IB2021/057270—Nov. 30, 2021.

3GPP TSG-RAN2 Meeting #108; Reno, USA; Change Request, 37.340 CR—rev—Current version: 15.7.0; Title: Draft stage-2 CR for Conditional PSCell Addition/Change (R2-1915985)—Nov. 18-22, 2019.

3GPP TSG-RAN WG2 Meeting #108; Reno, USA; Source: CATT (Rapporteur); Title: Report on Email Discussion [107b#52][NR MobE] Open Issues Conditional PSCell Addition/Change (CATT) (R2-1916300)—Nov. 18-22, 2019.

3GPP TSG-RAN WG2 #113e; Electronic meeting; Source: Ericsson; Title: Conditional PSCell Change / Addition (R2-2101270)—Jan. 25-Feb. 5, 2021.

3GPP TSG-RAN WG2 #115-e; Electronical meeting; Source: Ericsson; Title: UE procedures and signalling for CPAC (R2-2108113)—Aug. 9-27, 2021.

* cited by examiner

SYSTEMS AND METHODS FOR MASTER NODE-INITIATED CONDITIONAL PRIMARY SECONDARY CELL ADDITION

PRIORITY

This nonprovisional application is a U.S. National Stage Filing under 35 U.S.C. § 371 of International Patent Application Serial No. PCT/IB2021/057270 filed Aug. 6, 2021 and entitled "SYSTEMS AND METHODS FOR MASTER NODE-INITIATED CONDITIONAL PRIMARY SECONDARY CELL ADDITION" which claims priority to U.S. Provisional Patent Application No. 63/062,354 filed Aug. 6, 2020 both of which are hereby incorporated by reference in their entirety.

TECHNICAL FIELD

The present disclosure relates, in general, to wireless communications and, more particularly, systems and methods for systems and methods for master-node initiated conditional primary secondary cell addition.

BACKGROUND

Two new work items for mobility enhancements in Long-Term Evolution (LTE) and New-Radio (NR) have started in $3^{rd}$ Generation Partnership Project (3GPP) in Release 16. The main objectives of the work items are to improve the robustness at handover and to decrease the interruption time at handover.

One problem related to robustness at handover is that the handover command (HO Command) (RRCConnectionReconfiguration with mobilityControlInfo and RRCReconfiguration with a reconfigurationWithSync field) is normally sent when the radio conditions for the user equipment (UE) are already quite bad. That may lead to the HO Command not reaching the UE in time if the message is segmented or there are retransmissions.

Different solutions have been discussed to increase mobility robustness in LTE and NR. One solution for NR is called "conditional handover" or "early handover command." In order to avoid undesired dependence on the serving radio link upon the time (and radio conditions) where the UE should execute the handover, Radio Resource Control (RRC) signaling for the handover to the UE should be provided earlier. To achieve this, it is possible to associate the HO command with a condition (e.g., based on radio conditions possibly similar to the ones associated to an A3 event, where a given neighbour becomes X db better than target). As soon as the condition is fulfilled, the UE executes the handover in accordance with the provided handover command.

Such a condition could, for example, be that the quality of the target cell or beam becomes X dB stronger than the serving cell. The threshold Y used in a preceding measurement reporting event should then be chosen lower than the one in the handover execution condition. This allows the serving cell to prepare the handover upon reception of an early measurement report and to provide the RRCConnectionReconfiguration with mobilityControlInfo at a time when the radio link between the source cell and the UE is still stable. The execution of the handover is done at a later point in time (and threshold), which is considered optimal for the handover execution.

FIG. 1 illustrates an example of conditional handover (CHO) execution. More particularly, FIG. 1 illustrates an example with just a serving and a target cell. In practice, there may often be many cells or beams that the UE reported as possible candidates based on its preceding Radio Resource Management (RRM) measurements. The network should then have the freedom to issue conditional handover commands for several of those candidates. The RRCConnectionReconfiguration for each of those candidates may differ, for example, in terms of the HO execution condition (e.g., reference signal (RS) to measure and threshold to exceed) as well as in terms of the random access (RA) preamble to be sent when a condition is met.

While the UE evaluates the condition, it should continue operating per its current RRC configuration (i.e., without applying the conditional HO command). When the UE determines that the condition is fulfilled, it disconnects from the serving cell, applies the conditional HO command and connects to the target cell. These steps are equivalent to the current, instantaneous handover execution.

FIG. 2 illustrates the procedure for intra-Application Management Function (AMF)/User Plane Function (UPF) Conditional Handover as taken from 3GPP TS 37.300. As depicted, the steps include:

0/1. Same as step 0, 1 in FIG. 9.2.3.2.1-1 of section 9.2.3.2.1.

2. The source gNB decides to use CHO.
3. The source gNB issues a Handover Request message to one or more candidate gNBs.
4. Same as step 4 in FIG. 9.2.3.2.1-1 of section 9.2.3.2.1.
5. The candidate gNB sends HANDOVER REQUEST ACKNOWLEDGE message including configuration of CHO candidate cell to the source gNB.
6. The source gNB sends an RRCReconfiguration message to the UE, containing the configuration of CHO candidate cell(s) and CHO execution condition(s).
7. UE sends an RRCReconfigurationComplete message to the source gNB.
8. UE maintains connection with source gNB after receiving CHO configuration, and starts evaluating the CHO execution conditions for the candidate cell(s). If at least one CHO candidate cell satisfies the corresponding CHO execution condition, the UE detaches from the source gNB, applies the stored corresponding configuration for that selected candidate cell, synchronises to that candidate cell and completes the RRC handover procedure by sending RRCReconfigurationComplete message to the target gNB. The UE releases stored CHO configurations after successful completion of RRC handover procedure.

The UE can be configured with Dual Connectivity, communicating both via a Master Cell Group (MCG) and a Secondary Cell Group (SCG). When the UE is configured with dual connectivity, the UE is configured with two Medium Access Control (MAC) entities: one MAC entity for the MCG and one MAC entity for the SCG. In Multi-Radio Dual Connectivity (MR-DC) the cell groups are located in two different logical nodes (i.e., different Next-Generation Radio Access Network (NG-RAN) nodes), possibly connected via a non-ideal backhaul, one providing NR access and the other one providing either Evolved Universal Terrestrial Radio Access (E-UTRA) or NR access. One node acts as the Master Node (MN) and the other as the Secondary Node (SN). The MN and SN are connected via a network interface and at least the MN is connected to the core network.

The operation in MR-DC involves different reconfiguration procedures, like secondary node addition, secondary node modification, secondary node release, and secondary node change.

The signaling flow from for the SN addition, leading to a PSCell Change addition is described in 3GPP TS 37.340. The SN Addition procedure is initiated by the MN and is used to establish a UE context at the SN in order to provide resources from the SN to the UE. For bearers requiring SCG radio resources, this procedure is used to add at least the initial SCG serving cell of the SCG. This procedure can also be used to configure an SN terminated MCG bearer (where no SCG configuration is needed). FIG. 3 illustrates an example SN addition procedure. As depicted, the method of FIG. 3 includes:

1. The MN decides to request the target SN to allocate resources for one or more specific PDU Sessions/QoS Flows, indicating QoS Flows characteristics (QoS Flow Level QoS parameters, PDU session level TNL address information, and PDU session level Network Slice info). In addition, for bearers requiring SCG radio resources, MN indicates the requested SCG configuration information, including the entire UE capabilities and the UE capability coordination result. In this case, the MN also provides the latest measurement results for SN to choose and configure the SCG cell(s). The MN may request the SN to allocate radio resources for split SRB operation. In NGEN-DC and NR-DC, the MN always provides all the needed security information to the SN (even if no SN terminated bearers are setup) to enable SRB3 to be setup based on SN decision.

For MN terminated bearer options that require Xn-U resources between the MN and the SN, the MN provides Xn-U UL TNL address information. For SN terminated bearers, the MN provides a list of available DRB IDs. The S-NG-RAN node shall store this information and use it when establishing SN terminated bearers. The SN may reject the request.

For SN terminated bearer options that require Xn-U resources between the MN and the SN, the MN provides in step 1 a list of QoS flows per PDU Sessions for which SCG resources are requested to be setup upon which the SN decides how to map QoS flows to DRB.

NOTE 1: For split bearers, MCG and SCG resources may be requested of such an amount, that the QoS for the respective QoS Flow is guaranteed by the exact sum of resources provided by the MCG and the SCG together, or even more. For MN terminated split bearers, the MN decision is reflected in step 1 by the QoS Flow parameters signalled to the SN, which may differ from QoS Flow parameters received over NG.

NOTE 2: For a specific QoS flow, the MN may request the direct establishment of SCG and/or split bearers, i.e. without first having to establish MCG bearers. It is also allowed that all QoS flows can be mapped to SN terminated bearers. i.e. there is no QoS flow mapped to an MN terminated bearer.

2. If the RRM entity in the SN is able to admit the resource request, it allocates respective radio resources and, dependent on the bearer type options, respective transport network resources. For bearers requiring SCG radio resources the SN triggers UE Random Access so that synchronisation of the SN radio resource configuration can be performed. The SN decides for the PSCell and other SCG SCells and provides the new SCG radio resource configuration to the MN within an SN RRC configuration message contained in the SN Addition Request Acknowledge message. In case of bearer options that require Xn-U resources between the MN and the SN, the SN provides Xn-U TNL address information for the respective DRB, Xn-U UL TNL address information for SN terminated bearers, Xn-U DL TNL address information for MN terminated bearers. For SN terminated bearers, the SN provides the NG-U DL. TNL address information for the respective PDU Session and security algorithm. If SCG radio resources have been requested, the SCG radio resource configuration is provided.

NOTE 3: In case of MN terminated bearers, transmission of user plane data may take place after step 2.

NOTE 4: In case of SN terminated bearers, data forwarding and the SN Status Transfer may take place after step 2.

NOTE 5: For MN terminated NR SCG bearers for which PDCP duplication with CA is configured the MN allocates 2 separate Xn-U bearers.

For SN terminated NR MCG bearers for which PDCP duplication with CA is configured the SN allocates 2 separate Xn-U bearers.

2a. For SN terminated bearers using MCG resources, the MN provides Xn-U DL TNL address information in the Xn-U Address Indication message.

3. The MN sends the MN RRC reconfiguration message to the UE including the SN RRC configuration message, without modifying it 4. The UE applies the new configuration and replies to MN with MN RRC reconfiguration complete message, including an SN RRC response message for SN, if needed. In case the UE is unable to comply with (part of) the configuration included in the MN RRC reconfiguration message, it performs the reconfiguration failure procedure.

5. The MN informs the SN that the UE has completed the reconfiguration procedure successfully via SN Reconfiguration Complete message, including the SN RRC response message, if received from the UE.

6. If configured with bearers requiring SCG radio resources, the UE performs synchronisation towards the PSCell configured by the SN. The order the UE sends the MN RRC reconfiguration complete message and performs the Random Access procedure towards the SCG is not defined. The successful RA procedure towards the SCG is not required for a successful completion of the RRC Connection Reconfiguration procedure.

7. If PDCP termination point is changed to the SN for bearers using RLC AM, and when RRC full configuration is not used, the MN sends the SN Status Transfer.

8. For SN terminated bearers or QoS flows moved from the MN, dependent on the characteristics of the respective bearer or QoS flow, the MN may take actions to minimise service interruption due to activation of MR-DC (Data forwarding).

9-12. If applicable, the update of the UP path towards the 5GC is performed via a PDU Session Path Update procedure.

A solution for Conditional Primary SCell (PSCell) Change (CPC) procedure was standardized in Rel-16. Therein, a UE operating in MR-DC receives in a conditional reconfiguration one or multiple RRC Reconfiguration(s) (e.g., an RRCReconfiguration message) containing an SCG configuration (e.g., an secondaryCellGroup of IE Cell- GroupConfig) with a reconfigurationWithSync that is stored and associated to an execution condition (e.g., a condition like an A3/A5 event configuration)), so that one of the stored messages is only applied upon the fulfillment of the execution condition (e.g., associated with the serving PSCell), upon which the UE would perform PSCell change (in case it finds a neighbour cell that is better than the current SpCell of the SCG).

In Rel-16, CPC will be supported, but in Rel-17 also PSCell Addition will be included (i e. Conditional PSCell Addition/Change (CPAC)). In Rel-16, only intra-SN CPC without MN involvement is standardized. Inter SN PSCell CPC and CPC with MN involvement will be included in Rel-17.

The following agreements relate to the procedure:

1. We will prioritize work in SN-initiated PSCell change for conditional PSCell change.
2. Maintain Rel-15 principle that only one PScell is active at a time even with conditional PScell change.
3. For conditional PScell change, A3/A5 execution condition should be supported.
4. For conditional SN change, the source SN configuration can be used as the reference in generation of delta signalling for the candidate SNs.
5. Both the execution condition and the configuration for the candidate PSCell (as a container) can be included in the RRCReconfiguration message generated by the SN for intra-SN conditional PSCell change initiated by the SN (without MN involvement).
6. SRB1 can be used in all cases. SRB3 may be used to transmit conditional PScell change configuration to the UE for intra-SN change without MN involvement.
7. Limit to intra-SN change without MN involvement (i.e. no MN reconfiguration or decision needed but SRB1 can be used) in Rel-16.

Same as for CHO, the following agreements were agreed to for CPC:

1. Usage of CPAC is decided by the network. The UE evaluates when the condition is valid.
2. Support configuration of one or more candidate cells for CPAC;
   a. FFS how many candidate cells (UE and network impacts should be clarified). FFS whether the number of candidate cells for CPAC different from that of CHO.
3. Allow having multiple triggering conditions (using “and”) for CPAC execution of a single candidate cell. Only single RS type per CPAC candidate is supported. At most two triggering quantities (e.g. RSRP and RSRQ, RSRP and SINR, etc.) can be configured simultaneously. FFS on UE capability
4. Define an execution condition for conditional PSCell change by the measurement identity which identifies a measurement configuration
5. Cell level quality is used as baseline for Conditional NR PSCell change execution condition;
   a. Only single RS type (SSB or CSI-RS) per candidate PSCell is supported for PSCell change.
   b. At most two triggering quantities (e.g. RSRP and RSRQ, RSRP and SINR, etc.) can be configured simultaneously. FFS on UE capability.
   c. TIT is supported for CPAC execution condition (as per legacy configuration)
6. No additional optimizations with multi-beam operation are introduced to improve RACH performance for conditional PSCell change completion with multi-beam operation.
7. For FR1 and FR2, leave it up to UE implementation to select the candidate PSCell if more than one candidate cell meets the triggering condition. UE may consider beam information in this.
8. UE is not required to continue evaluating the triggering condition of other candidate PSCell(s) during conditional SN execution.

Additional agreements relating to CPC from RAN2 #109e include:

1. Similar to CHO, the following applies to CPC-intra-SN configuration
   Reuse the RRCReconfiguration/RRCConnectionReconfiguration procedure to signal CPC-intra-SN configuration to UE.
   The MN is not allowed to alter any content of the configuration from the SN which is carried in an RRC container.
   Multiple candidate PSCells can be sent in either one or multiple RRC messages.
   Use add/mod list+release list to configure multiple candidate PSCells.
   CPC-intra-SN execution condition and/or candidate PSCell configuration can be updated by the SN (i.e. by modifying the existing CPC-intra-SN configuration).
2. Once the CPC-intra-SN procedure is executed successfully, the UE releases all CPC-intra-SN configurations stored on the UE side.
3. Upon the successful completion of conventional PSCell change procedure, the UE releases all CPC-intra-SN configurations.
4. The SCG failure information procedure can be used for CPC-intra-SN procedure failure (due to RLF, T304-like timer expiry or compliance check failure).
5. For Future Study: In case of SRB3, the MN is not informed of CPC-intra-SN execution by the UE.
6. If SRB3 is not configured, the UE first informs the MN that the message has been received. Then the UE needs to provide the CPC complete message to the SN via the MN upon CPC execution.
7. CPC reuses the IE defined for CHO. The field name of the IE could be changed to reflect that the IE is used for both CHO and CPC.

Further agreements relating to CPC from RAN2 #109e include:

S1_1: While executing CPC procedure, the UE continues to receive RRC reconfiguration from the MN. However, the UE should finalise the ongoing CPC execution before processing the RRC message received from the MN (same as in the conventional PSCell change). i.e. legacy behaviour and no specific UE requirement.

S1_2: As in legacy PSCell change, the UE sends RRCReconfigurationComplete to the MN at execution of CPC when no SRB3 is configured and the MN informs the SN. i.e. the complete message to MN includes an embedded complete message to the SN.

S1_3: The UE sends RRCReconfigurationComplete to the MN at configuration of CPC when no SRB3 is configured and the MN informs the SN. i.e. the complete message to the MN includes an embedded complete message to the SN.

S1_4. Upon RLF on PCell during the execution of Conditional PSCell change for intra-SN change without MN involvement, the UE supports the Rel-16 MR-DC procedures, i.e. performs connection re-establishment procedure without any fast MCG link recovery.

S1_5: Support of CHO and CPC-intra-SN configuration simultaneously is not considered in Rel-16. Leave it up to the network solution to ensure there is no simultaneous CHO and CPC configuration.

S2_6: Reconfirm the use of SCG failure information upon declaring SCG failure in the procedure of the conditional PSCell change.

S2_7. When the conditional PSCell configuration received over SRB3 is invalid, UE initiates SCG failure information procedure to report to the MN about the SN change failure due to invalid configuration (legacy procedure).

S2_9. Like CHO. UE shall follow the below procedures for handling the T310 and T304 timers during conditional PSCell addition/change procedure for EN-DC, NGEN-DC, NR-DC cases:

UE shall not stop MN T310 or SN T310 and shall not start T304 when it receives configuration of a CPC-intra-SN The timer T310 (SN only in case of SN Change) is stopped and timer T304-like is started when the UE begins execution of a CPC-intra-SN.

S3_11. UE checks the validity of conditional PSCell change execution criteria configuration immediately on receiving the conditional PSCell change RRC Reconfiguration message, either embedded in the MN RRC message over SRB1 or received over SRB3 (same as CHO).

S3_12. Introduce no specification changes regarding compliance checking of embedded Reconfiguration message containing configuration of conditional PSCell candidate (same as for CHO).

S2_8 UE performs connection re-establishment procedure or actions upon going to RRC_IDLE (legacy procedure) when the conditional PSCell configuration received over SRB1 is invalid, i.e. UE cannot comply with the embedded PSCell configuration for intra-SN Change Additional agreements relating to CPC from RAN2 #109 bis-c include:

1. The UE docs not inform the MN when CPC execution condition is fulfilled and the UE starts executing CPC, when CPC configuration is provided over SRB3.
2. A threshold parameter is not introduced to determine PCell quality for execution of CPC.
3. Upon transmission of SCG failure information to the network, the UE stops evaluating the CPC execution criteria according to the current CPC configuration until a response is received from the network.
4. Whether the UE continue measurements for candidate PSCells configured for execution condition upon CPC failure is left to the UE implementation.
5. The content of FailureReportSCG for CPC procedure failure should include failureType, measResultFreqList and measuResultSCG-Failure. These parameters are set according to the exiting SCGFailureInformation procedure. (same as legacy)
6. Use ULInformationTransferMRDC instead of RRCReconfigurationComplete message to inform the network of CPC execution when no SRB3 is configured and the MN informs the SN, i.e. ULInformationTransferMRDC message to MN includes an embedded RRCReconfigurationComplete message to the SN. This applies to both NR MN and LTE MN. (change of previous agreement).

Further agreements relating to CPC from RAN2 #109 bis-e include:

1. If CPC configuration is not released by network, the UE autonomously releases the stored CPC configuration upon the SCG release.
2. measID and reportConfig associated with CPC config, and measObject(s) only associated to CPC shall be autonomously removed by UE when SCG is released.
3. Support of CPC configuration (CPC condition+CPC reconfiguration) in legacy HO command or CPC configuration in CPC configuration should not be considered in Rel-16.

As described above, in Rel-16 only the case intra-SN case without MN involvement for CPC is supported (i.e., where S-SN and T-SN are the same node in picture 10.5.1-2 from 3GPP TS 37.340). That means that the cell is changed, but both the old and the new cell are in the same node.

There currently exist certain challenges. One problem relates to a new scenario to be supported in Rel-17, which is when a UE is capable of operating in MR-DC (i.e., the UE is capable of having a connection with a Master Node (MN) and a Secondary Node (SN)) and, the UE needs to be configured with an a target candidate PSCell associated to a target candidate SN (T-SN) to be added upon the fulfillment of an execution condition. None of the existing approaches can be easily applied. For example, the solution for CHO does not involve MR-DC related inter-node messages, and the solutions for CPC defined in Rel-16 relies on the Source SN (same as Target SN, as only intra-SN is supported) to generate the CPC configuration, not suitable in CPA where an SN is not yet established until the CPA execution.

Based on the existing signaling and procedures for MN-initiated PSCell Addition, as defined in Rel-15 and illustrated in FIG. 3, the following problems would exist. First, according to previous approaches, the MN decides to request the target SN to allocate resources for one or more specific PDU Sessions/QoS Flows, indicating QoS Flows characteristics such as, for example, QoS Flow Level QoS parameters, PDU session level TNL address information, and PDU session level Network Slice info. In addition, for bearers requiring SCG radio resources, MN indicates the requested SCG configuration information, including the entire UE capabilities and the UE capability coordination result. In this case, the MN also provides the latest measurement results for SN to choose and configure the SCG cell(s). The MN may request the SN to allocate radio resources for split SRB operation. In NGEN-DC and NR-DC, the MN always provides all the needed security information to the SN (even if no SN terminated bearers are setup) to enable SRB3 to be setup based on SN decision.

A problem with the described approach is that MN is triggering the T-SN (denoting a Target SN candidate, or simply SN as shown in FIG. 3) to prepare for a coming UE within a short time. For example, when the UE receives the RRC Reconfiguration as generated by the SN, the T-SN applies it and performs random access with the SpCell of the SCG associated to the SN. However, in CPA, the UE may access the PSCell with a longer time or may not access the cell at all such as, for example, when the UE accesses another prepared candidate. That may affect the way the SN prepares its resources for the preparation procedure and determines the acceptance of the UE. For example, the SN may set timers to a low value. When the UE does not access the cell, the SN declares a failure in the procedure while in reality the procedure has not really failed but is simply a conditional procedure. Resource reservation may also be different in the SN if the addition is conditional (i.e. to avoid reserving resources that may never be used).

A second problem may be that, if the RRM entity in the SN is able to admit the resource request, it allocates respective radio resources and, dependent on the bearer type options, respective transport network resources. For bearers requiring SCG radio resources, the SN triggers UE Random Access so that synchronisation of the SN radio resource configuration can be performed. The SN decides for the PSCell and other SCG SCells and provides the new SCG radio resource configuration to the MN within an SN RRC configuration message contained in the SN Addition Request Acknowledge message. In case of bearer options that require Xn-U resources between the MN and the SN, the SN provides Xn-U TNL address information for the respective DRB, Xn-U UL TNL address information for SN terminated bearers, Xn-U DL TNL address information for MN terminated bearers. For SN terminated bearers, the SN provides the NG-U DL TNL address information for the respective PDU Session and security algorithm. If SCG radio resources have been requested, the SCG radio resource configuration is provided.

A problem with this previous approach is that the SN creates an SCG configuration (e.g., an RRCReconfiguration**) to be put within an RRCReconfiguration* generated by the MN (in MN format), wherein the RRCReconfiguration* is sent to the UE. The field nr-SCG (or equivalent) is set to RRCReconfiguration**.

In MN-initiated CPA that cannot be done otherwise, the UE would apply the SCG configuration upon reception which is not intended in CPA.

It is also not clear which node should create/generate the message with the condition associated to the target candidate SN.

Another problem relates to the handling of complete/ack messages from the UE during preparation/execution of CPA. According to the previous approach, a single procedure/step is used to acknowledge the compliance of MN/MCG configuration and target SCG/SN configurations, where UE includes an SCG complete within the RRC Reconfiguration Complete message (RRCReconfigurationComplete*(RRCReconfigurationComplete**)). However, it is not clear how that should be done in MN-initiated CPA, as during preparation the SN candidate may not have provided a configuration applied or verified at the UE (only upon execution).

A third problem may be that, if the previous approach is used and if the RRC connection reconfiguration procedure would be successful, the MN would inform the target SN via SN Reconfiguration Complete message with the included SN RRC response message for the target SN, if received from the UE. However, in conditional SN addition (also called CPA), there may be one or more SN candidates. Thus, it is not clear to which node which complete message is forwarded when and/or if received in MN upon CPA execution. It is particularly unclear, how the MN is aware of which target candidate SN the complete message is associated to in case multiple target candidate cells associated to multiple target candidate SN(s) were configured.

SUMMARY

Certain aspects of the present disclosure and their embodiments may provide solutions to these or other challenges. For example, the present disclosure describes various approaches for configuration of conditional PSCell addition.

According to certain embodiments, a method by a network node for conditional Primary Secondary Cell Addition (CPA), where the network node is operating as a Master Node (MN), includes sending, to a target candidate secondary node (SN) an S-Node Addition Request message, which indicates that the request is for the CPA. The network node receives, from the target candidate SN, an S-Node Addition Request Acknowledge message comprising an RRC Reconfiguration message (which is referred to herein as RRCReconfiguration) for a target candidate cell. The RRCReconfiguration includes a Secondary Cell Group (SCG) configuration. The network node sends, to a wireless device, another RRC Reconfiguration message (which is referred to herein as RRCReconfiguration) in a MN format. The RRCReconfiguration includes at least one conditional reconfiguration for the CPA.

The conditional reconfiguration includes:

for the target candidate cell, another RRC Reconfiguration message (RRCReconfiguration*) in MN format and a Master Cell Group (MCG) configuration;

at least one execution condition for the CPA; and and a conditional reconfiguration identity associated with the CPA for the target candidate cell.

The RRCReconfiguration* includes the RRCReconfiguration**. The network node receives, from the wireless device, a first reconfiguration complete message.

According to certain embodiments, a network node operating as a MN, includes processing circuitry configured to send, to a target candidate SN, an S-Node Addition Request message, which indicates that the request is for the CPA. The processing circuitry is configured to receive, from the target candidate SN, an S-Node Addition Request Acknowledge message comprising an RRC Reconfiguration message (which is referred to herein as RRCReconfiguration) for a target candidate cell. The RRCReconfiguration includes a SCG configuration. The processing circuitry is configured to send, to a wireless device, another RRC Reconfiguration message (which is referred to herein as RRCReconfiguration) in a MN format. The RRCReconfiguration includes at least one conditional reconfiguration for the CPA. The conditional reconfiguration includes:

for the target candidate cell, another RRC Reconfiguration message (RRCReconfiguration*) in MN format and a Master Cell Group (MCG) configuration;

at least one execution condition for the CPA; and and a conditional reconfiguration identity associated with the CPA for the target candidate cell.

The RRCReconfiguration* includes the RRCReconfiguration**. The processing circuitry is configured to receive, from the wireless device, a first reconfiguration complete message.

According to certain embodiments, a method by a wireless device for CPA includes receiving, from a network node operating as a MN, an RRC Reconfiguration message (which is referred to herein as RRCReconfiguration) in a MN format. The RRCReconfiguration comprises at least one conditional reconfiguration for the CPA. The conditional reconfiguration includes:

for the target candidate cell, another RRC Reconfiguration message (which is referred to herein as RRCReconfiguration*) in MN format and a MCG configuration, wherein the RRCReconfiguration* includes another RRC Reconfiguration message (which is referred to herein as RRCReconfiguration**) that includes a SCG configuration for a target candidate cell;

at least one execution condition for the CPA; and a conditional reconfiguration identity associated with the CPA for the target candidate cell.

The wireless device transmits, to the network node, a reconfiguration complete message.

According to certain embodiments, a wireless device for CPA includes processing circuitry configured to receive, from a network node operating as a MN, an RRC Reconfiguration message (which is referred to herein as RRCReconfiguration) in a MN format. The RRCReconfiguration comprises at least one conditional reconfiguration for the CPA. The conditional reconfiguration includes:

for the target candidate cell, another RRC Reconfiguration message (which is referred to herein as RRCReconfiguration*) in MN format and a MCG configuration, wherein the RRCReconfiguration* includes another RRC Reconfiguration message (which is referred to herein as RRCReconfiguration**) that includes a SCG configuration for a target candidate cell;

at least one execution condition for the CPA; and a conditional reconfiguration identity associated with the CPA for the target candidate cell.

The processing circuitry is configured to transmit, to the network node, a reconfiguration complete message.

Certain embodiments may provide one or more of the following technical advantages. For example, certain embodiments described herein may advantageously utilize the configuration of conditional PSCell addition.

As another example, a technical advantage of certain embodiments may be that the MN does not need to understand the configurations created by the SN candidate(s), which may be more beneficial in the case MN and SN candidates belong to different Radio Access Technologies (RATs), like in NR-E-UTRA Dual Connectivity (NE-DC) and/or E-UTRAN-New Radio Dual Connectivity (EN-DC). In other words, the SCG associated message to be applied upon execution does not have to be in MN format (i.e., which advantageously makes the method applicable for an EN-DC or other forms of inter-RAT DC, like MR-DC).

As still another example, a technical advantage of certain embodiments as compared to previous approaches for SN addition, may be that further intelligence is added in the MN in the sense that the MN may generate a series of nested RRC Reconfiguration to generate the conditional reconfiguration. Whereas, previous techniques provided by CPC Rel-16 for SN-initiated intra-SN CPC require further intelligence such as, for example, requiring that the MN receive an RRCReconfiguration that includes an SCG configuration already prepared for the CPC to forward to the UE. An advantage with certain embodiments is that they rely on the forwarding from the MN of execution conditions to the SN, if MN the node determining these conditions, to enable the SN to generate the CPA configuration and possibly use some common steps for CPA and CPC.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
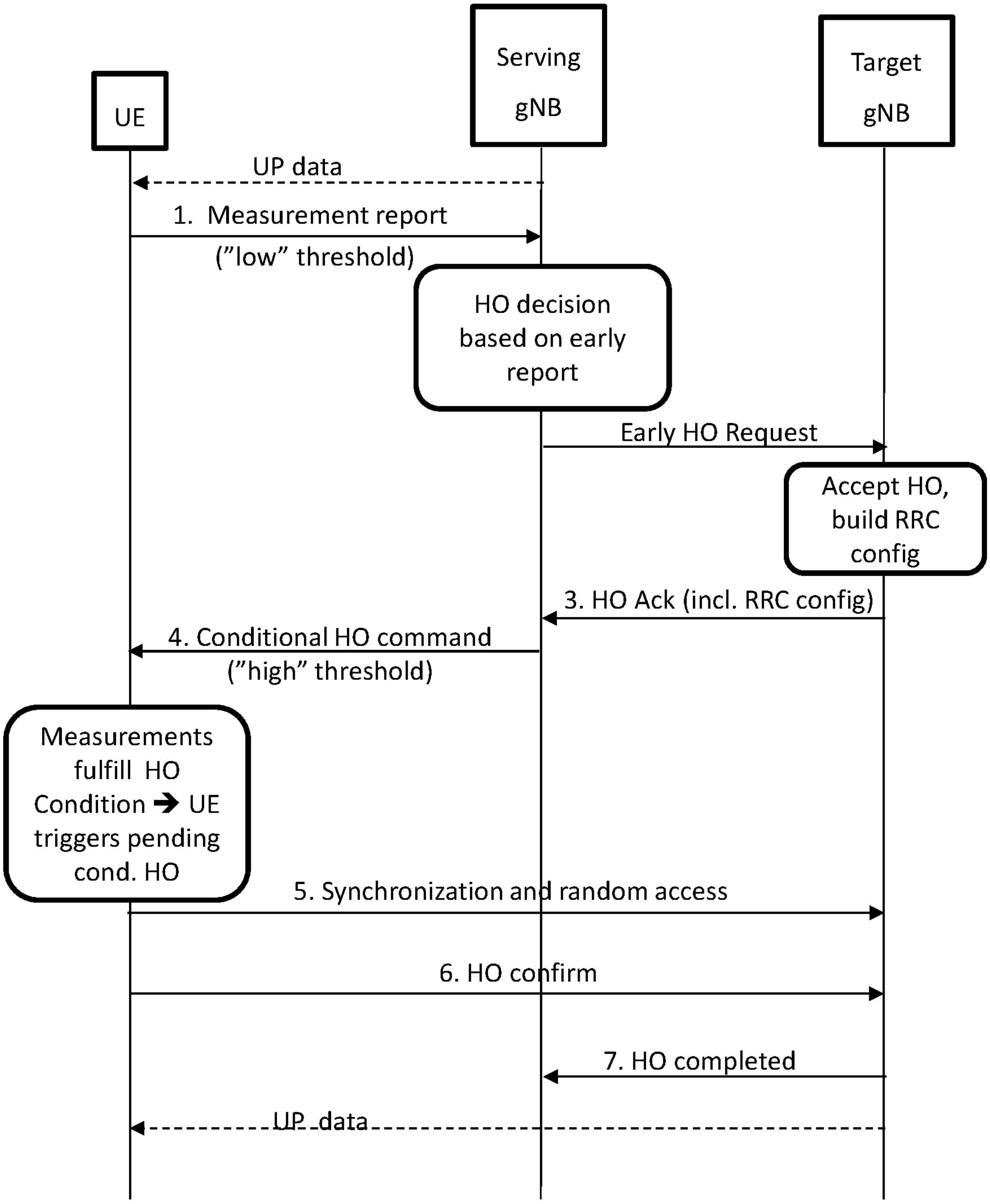
FIG. 1 illustrates an example of CHO execution.
Figure 2:
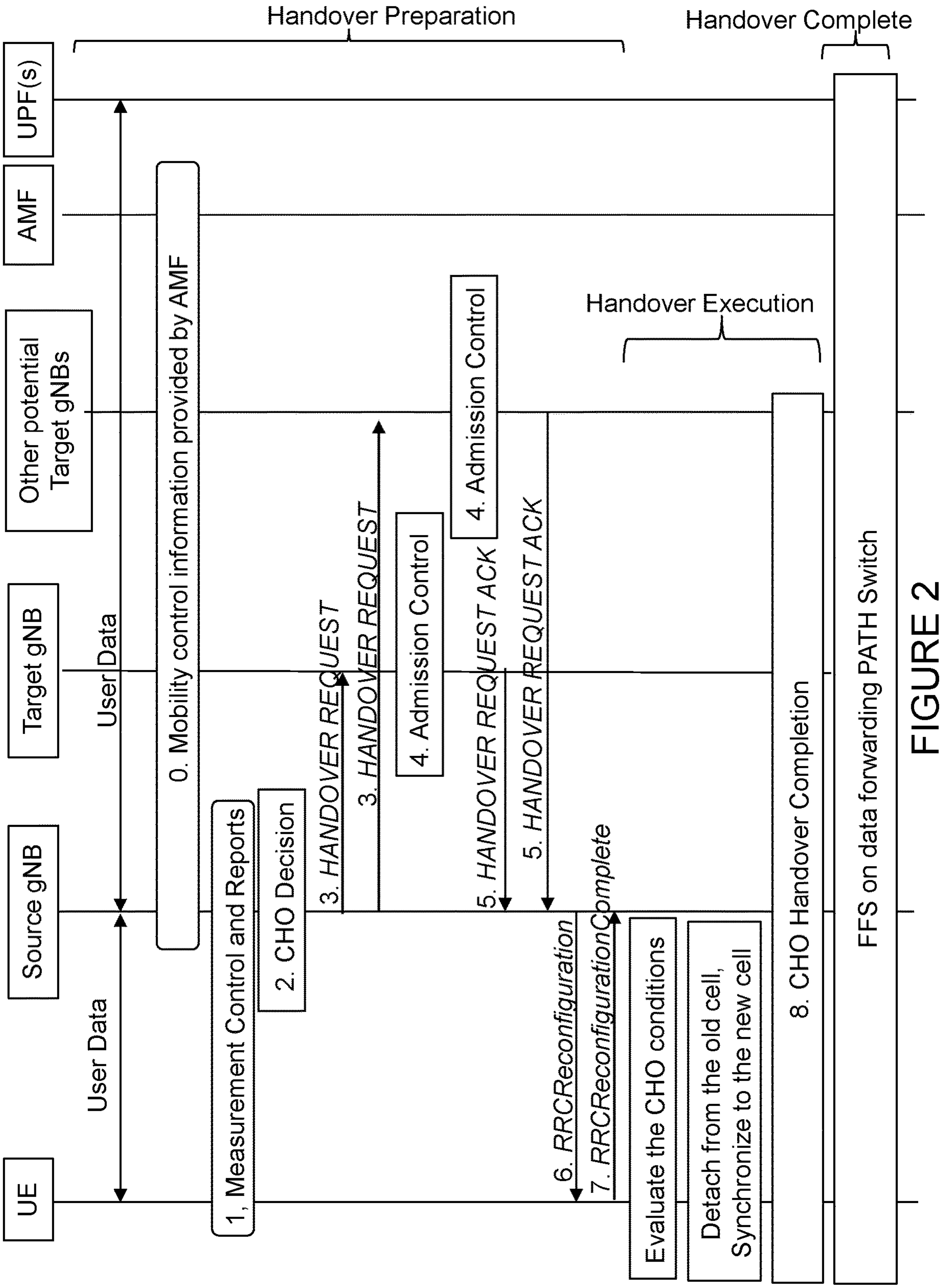
FIG. 2 illustrates the procedure for intra-AMF/UPF Conditional Handover as taken from 3GPP TS 37.300.
Figure 3:
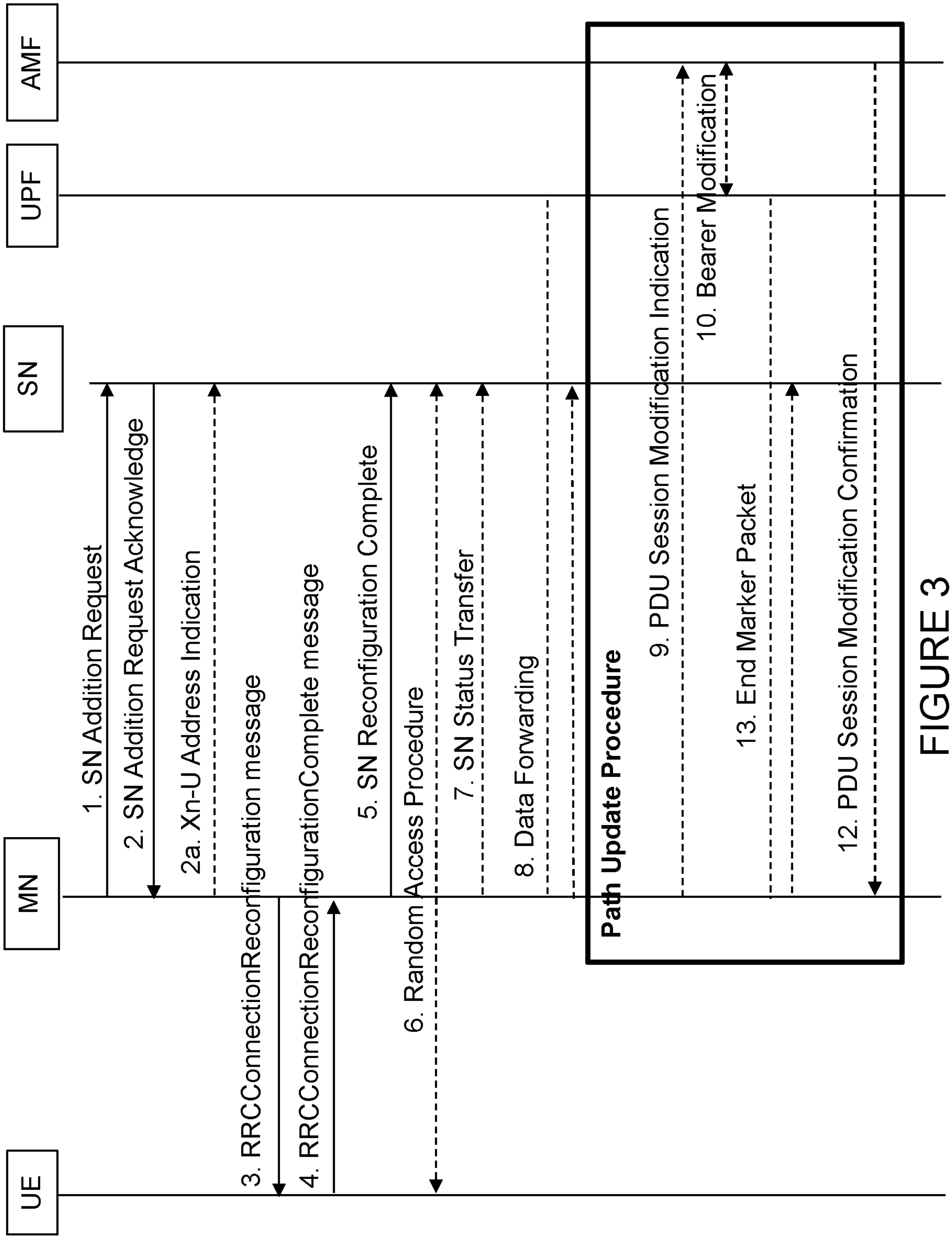
FIG. 3 illustrates an example procedure for PSCell addition.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The present disclosure refers to a User-Equipment (UE) operating in Multi Radio-Dual Connectivity (MR-DC) according to New Radio (NR) specifications such as, for example, 3GPP TS 37.340 and 3GPP TS 38.331. The present disclosure refers to a first network node operating as a Master Node (MN) (e.g., having a Master Cell Group (MCG) configured to the UE and/or an MN-terminated bearer). That MN can be a gNodeB (gNB), a Central Unit gNodeB (CU-gNB), an eNodeB (eNB), a Central Unit eNodeB (CU-gNB), or any network node and/or network function. The present disclosure also refers to a second network node operating as a Secondary Node (SN), or Source Secondary Node (S-SN) (e.g., having a Secondary Cell Group (SCG) configured to the UE and/or an SN-terminated bearer). That SN can be a gNB, a CU-gNB, an eNB, a CU-gNB, or any network node and/or network function. Note that MN, S-SN, and T-SN may be from the same or different RATs (and possibly be associated to different Core Network (CN) nodes).

The present disclosure refers to a target candidate SN, or target SN (T-SN) candidate, or an SN, or SN candidate or candidate SN, as the network node (e.g., gNB) that is prepared during the Conditional PSCell Addition (CPA) procedure and that creates an Radio Resource Control (RRC) Reconfiguration message with an SCG configuration (e.g., RRCReconfiguration**) to be provided to the User Equipment (UE) and stored, with an execution condition, wherein the UE only applies the message upon the fulfillment of the execution condition. That target candidate SN (or simply SN candidate) is associated to one or multiple target PSCell candidate cell(s) that the UE can be configured with. The UE then can execute the condition and access one of these target candidate cells, associated to a target candidate SN that becomes the target SN or simply the SN after execution (i.e., upon fulfillment of the execution condition).

The present disclosure refers to a Conditional PSCell Change (CPC) and/or CPA and/or Conditional PSCell Change/Addition (CPAC) configuration and procedures (like CPAC execution). Other terms may be considered as synonyms such as conditional reconfiguration, or Conditional Configuration (since the message that is stored and applied upon fulfillment of a condition is an RRCReconfiguration or RRCConnectionReconfiguration). Terminology wise, one could also interpret conditional handover (CHO) in a broader sense, also covering CPC or CPAC procedures.

The configuration of CAP can be done using the same Information Elements (IEs) as conditional handover, which may be called at some point conditional configuration or conditional reconfiguration. The principle for the configuration is the same with configuring triggering/execution condition(s) and a reconfiguration message to be applied when the triggering condition(s) are fulfilled. The configuration IEs are disclosed in 3GPP TS 38.331.

In the present disclosure the terms handover, reconfigurationWithSync, PSCell change are used in the same context.

The methods described herein comprise different embodiments in terms of inter-node signaling and inter-node procedures to configure MN initiated CPA.

In one set of embodiments, a first network node operating as a MN determines to configure CPA for a UE operating in MR-DC. That determination may be based on measurements reports received from the UE. Upon determining to configure CPA, the MN transmits a request to a target SN indicating that CPA is to be configured for a given UE.

Figure 4:
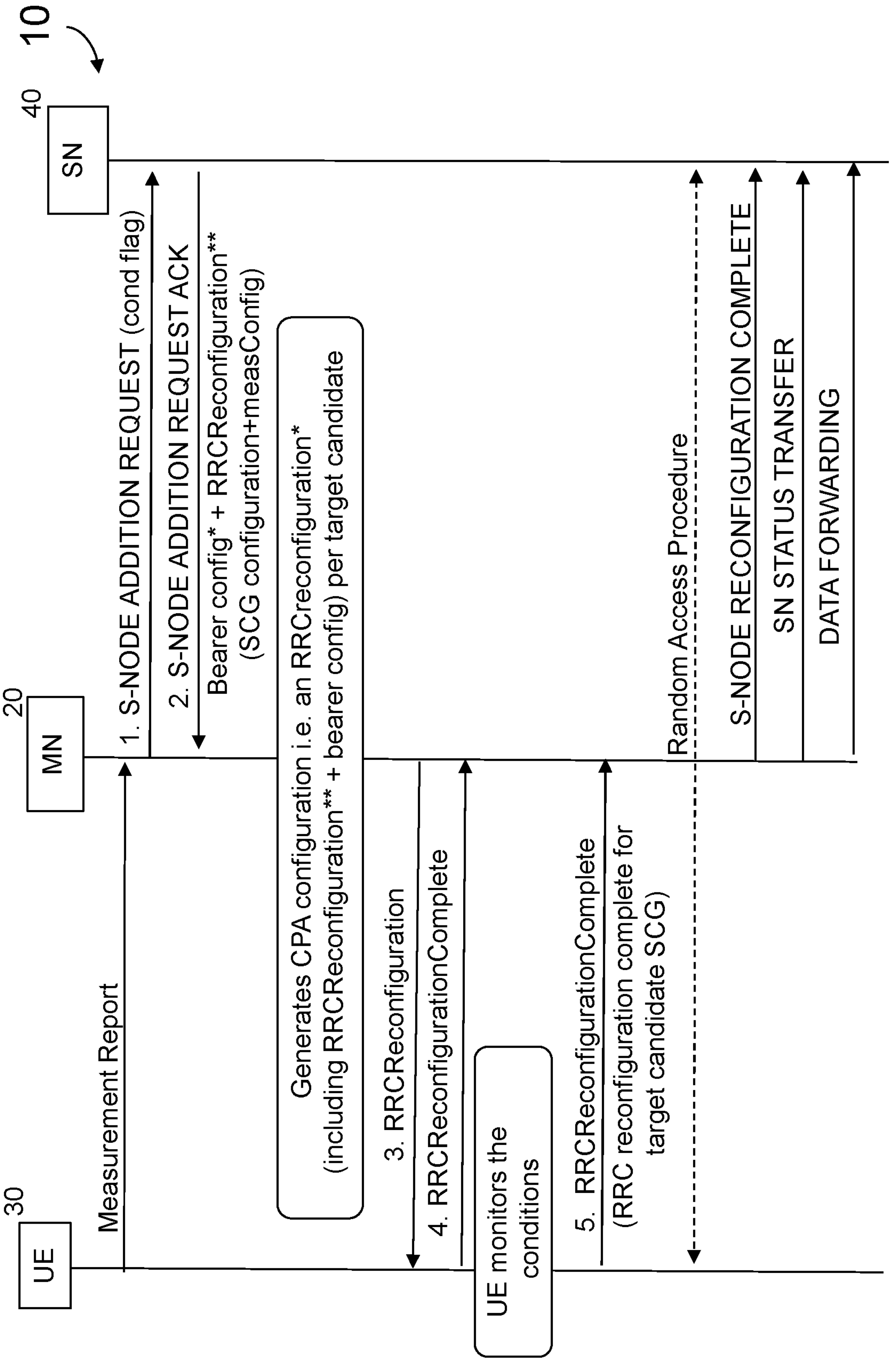
FIG. 4 illustrates an example signalling diagram of CPA as initiated by a MN, according to certain embodiments.

FIG. 4 illustrates an example signalling diagram 10 of CPA as initiated by a MN, according to certain embodiments. The steps illustrated in FIG. 4 are described in more detail below.

At step 1, according to certain embodiments, the node 20 operating as MN for a UE 30 operating in MR-DC decides to configure CPA for the UE. In a particular embodiment, the decision may be based on, for example, measurement reports received from the UE 30. Upon determining to configure CPA, the MN 20 sends to the T-SN 40 an S-NODE ADDITION REQUEST message including an indication that the request is for CPA. This is not for a PSCell Addition to be performed immediately as in previous approaches. In FIG. 4, the term "cond flag" has been used as the indication, but this is merely provided as an example. Other indications may be used. Further, the message may contain an implicit indication, rather than an explicit indication. For example, the indication may be indicated by the fact that an IE in included or a list of cells is included.

An example of an enhanced version of the S-NODE ADDITION REQUEST according to the method illustrated in FIG. 4 is shown below. One distinguishing aspect is that the configuration is for CPA and not for CPC. It is the MN 20 that decides to configure CPA and initiates the setting of the conditional flag. In this example, the indicator distinguishes SN Addition for the CPA from the CPC, as disclosed in 3GPP TS 38.423.

9.1.2.1 S-Node Addition Request

This message is sent by the M-NG-RAN node to the S-NG-RAN node to request the preparation of resources for dual connectivity operation for a specific UE.

Direction: M-NG-RAN node→S-NG-RAN node.

| IE/Group Name | Presence | Range | IE type and reference | Semantics description |
|---|---|---|---|---|
| Message Type | M | | 9.2.3.1 | |
| M-NG-RAN node UE XnAP ID | M | | NG-RAN node UE XnAP ID 9.2.3.16 | Allocated at the M-NG-RAN node |
| UE Security Capabilities | M | | 9.2.3.49 | |
| S-NG-RAN node Security Key | M | | 9.2.3.51 | |
| S-NG-RAN node UE Aggregate Maximum Bit Rate | M | | UE Aggregate Maximum Bit Rate 9.2.3.17 | The UE Aggregate Maximum Bit Rate is split into M-NG-RAN node UE Aggregate Maximum Bit Rate and S-NG-RAN node UE Aggregate Maximum Bit Rate which are enforced by M-NG-RAN node and S-NG-RAN node respectively. |

-continued

| IE/Group Name | Presence | Range | IE type and reference | Semantics description |
|---|---|---|---|---|
| Selected PLMN | O | | PLMN Identity 9.2.2.4 | The selected PLMN of the SCG in the S-NG-RAN node |
| Mobility Restriction List | O | | 9.2.3.53 | |
| Index to RAT/Frequency Selection Priority | O | | 9.2.3.23 | |
| PDU Session Resources To Be Added List | | 1 | | |
| >PDU Session Resources To Be Added Item | | 1 . . . maxnoofPDUSessions | | NOTE: If neither the PDU Session Resource Setup Info - SN terminated IE nor the PDU Session Resource Setup Info - MN terminated IE is present in a PDU Session Resources To Be Added Item IE, abnormal conditions as specified in clause 8.3.1.4 apply. |
| >>PDU Session ID | M | | 9.2.3.18 | |
| >>S-NSSAI | M | | 9.2.3.21 | |
| >>S-NG-RAN node PDU Session Aggregate Maximum Bit Rate | O | | PDU Session Aggregate Maximum Bit Rate 9.2.3.69 | |
| >>PDU Session Resource Setup Info - SN terminated | O | | 9.2.1.5 | |
| >>PDU Session Resource Setup Info - MN terminated | O | | 9.2.1.7 | |
| M-NG-RAN node to S-NG-RAN node Container | M | | OCTET STRING | Includes the CG-ConfigInfo message as defined in subclause 11.2.2 of TS 38.331 [10] |
| S-NG-RAN node UE XnAP ID | O | | NG-RAN node UE XnAP ID 9.2.3.16 | Allocated at the S-NG-RAN node |
| Expected UE Behaviour | O | | 9.2.3.81 | |
| Requested Split SRBs | O | | ENUMERATED (srb1, srb2, srb 1&2, . . . ) | Indicates that resources for Split SRBs are requested. |
| PCell ID | O | | Global NG-RAN Cell Identity 9.2.2.27 | |
| Desired Activity Notification Level | O | | 9.2.3.77 | |
| Available DRB IDs | C-ifSNterminated | | DRB List 9.2.1.29 | Indicates the list of DRB IDs that the S-NG-RAN node may use for SN-terminated bearers. |
| S-NG-RAN node Maximum Integrity Protected Data Rate Uplink | O | | Bit Rate 9.2.3.4 | The S-NG-RAN node Maximum Integrity Protected Data Rate Uplink is a portion of the UE's Maximum Integrity Protected Data Rate in the Uplink, which is enforced by the S-NG-RAN node for the UE's SN |

-continued

| IE/Group Name | Presence | Range | IE type and reference | Semantics description |
|---|---|---|---|---|
| | | | | terminated PDU sessions. If the S-NG-RAN node Maximum Integrity Protected Data Rate Downlink IE is not present, this IE applies to both UL and DL. |
| S-NG-RAN node Maximum Integrity Protected Data Rate Downlink | O | | Bit Rate 9.2.3.4 | The S-NG-RAN node Maximum Integrity Protected Data Rate Downlink is a portion of the UE's Maximum Integrity Protected Data Rate in the Downlink, which is enforced by the S-NG-RAN node for the UE's SN terminated PDU sessions. |
| Location Information at S-NODE reporting | O | | ENUMERATED (pscell, . . . ) | Indicates that the user's Location Information at S-NODE is to be provided. |
| MR-DC Resource Coordination Information | O | | 9.2.2.33 | Information used to coordinate resource utilisation between M-NG-RAN node and S-NG-RAN node |
| Masked IMEISV | O | | 9.2.3.32 | |
| NE-DC TDM Pattern | O | | 9.2.2.38 | |
| SN Addition Trigger Indication | O | | ENUMERATED (SN change, inter-MN HO, intra-MN HO, . . . ) | This IE indicates the trigger for S-NG-RAN node Addition Preparation procedure |
| Trace Activation | O | | 9.2.3.55 | |
| Requested Fast MCG recovery via SRB3 | O | | ENUMERATED (true, . . . ) | Indicates that the resources for fast MCG recovery via SRB3 are requested. |
| UE Radio Capability ID | O | | 9.2.3.138 | |
| CPC Information | O | | ENUMERATED (cpc, . . . ) | Indicates that the procedure is triggered for a Conditional PSCell Change |

| Range bound | Explanation |
|---|---|
| maxnoofPDUSessions | Maximum no. of PDU sessions. Value is 256 |

| Condition | Explanation |
|---|---|
| ifSNterminated | This IE shall be present if there is at least one PDU Session Resource Setup Info - SN terminated in the PDU Session Resources To Be Added List IE. |

At step 2 in the example embodiment of FIG. 4, the node operating as candidate Target SN (candidate T-SN) 40 sends to the MN 20 an S-NODE ADDITION REQUEST ACKNOWLEDGE message, including an RRC Reconfiguration message (e.g., RRCReconfiguration created/generated by that target candidate SN) associated to at least one Secondary Cell Group, wherein the SpCell and SCells of the SCG are associated to the target candidate SN 40. That RRC Reconfiguration (RRCReconfiguration) can be, for example, included in an RRC container like the CG-Config.

In a particular embodiment, the RRCReconfiguration** message contains a secondary cell group configuration with a reconfigurationWithSync within so that upon applying it the UE triggers a random access with the PSCell to be added.

An example is shown below:

S-Node Addition Request Acknowledge

This message is sent by the S-NG-RAN node to confirm the M-NG-RAN node about the S-NG-RAN node addition preparation (or S-NG-RAN node addition preparation for Conditional reconfiguration).

Direction: S-NG-RAN node→M-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | M | | NG-RAN node UE XnAP ID 9.2.3.16 | Allocated at the S-NG-RAN node | YES | reject |
| . . . | . . . | | . . . | | . . . | |
| S-NG-RAN node to M-NG-RAN node Container | M | | OCTET STRING | Includes the CG-Config message as defined in subclause 11.2.2 of TS 38.331 [10]. Note: in the example above this is includes the RRCReconfiguration** generated by the target candidate SN. | YES | reject |
| Location Information at S-NODE | O | | Target Cell Global ID 9.2.3.25 | Contains information to support localisation of the UE | YES | ignore |
| MR-DC Resource Coordination Information | O | | 9.2.2.33 | Information used to coordinate resource utilisation between M-NG-RAN node and S-NG-RAN node. | YES | ignore |

In case the T-SN can prepare multiple target candidate cells, the IE within the message may contain multiple configurations for multiple candidate cells. Alternatively, that contains a list of containers for additional CG-config messages related to the additional candidate cells.

CG-Config message

```
-- ASN1START
-- TAG-CG-CONFIG-START
. . .
CG-Config-IEs ::=                    SEQUENCE {
   scg-CellGroupConfig                  OCTET STRING (CONTAINING
RRCReconfiguration)                 OPTIONAL,
   scg-RB-Config                      OCTET STRING (CONTAINING
RadioBearerConfig)               OPTIONAL,
   configRestrictModReq                    ConfigRestrictModReqSCG
   drx-InfoSCG                        DRX-Info                OPTIONAL,
   candidateCellInfoListSN                 OCTET STRING (CONTAINING
MeasResultList2NR)                  OPTIONAL,
   measConfigSN                         MeasConfigSN              OPTIONAL,
   selectedBandCombination                   BandCombinationInfoSN
OPTIONAL,
   fr-InfoListSCG                      FR-InfoList              OPTIONAL,
   candidateServingFreqListNR                  Candidate ServingFreqListNR
OPTIONAL,
   nonCriticalExtension                  CG-Congif-v1540-IEs
OPTIONAL
}
```

-continued

| CG-Config message | |
|---|---|
| MeasConfigSN ::= | SEQUENCE { |
| measuredFrequenciesSN | SEQUENCE (SIZE (1..maxMeasFreqsSN)) OF |
| NR-FreqInfo OPTIONAL, | |
| ... | |
| } | |
| ... | |
| -- TAG-CG-CONFIG-STOP | |
| -- ASN1STOP | |

...
scg-CellGroupConfig
Contains the RRCReconfiguration message (containing only secondaryCellGroup and/or measConfig):

- to be sent to the UE, used upon SCG establishment, modification or conditional reconfiguration for a target candidate SCG (e.g. CPC), as generated (entirely) by the (target) SgNB (or target candidate SgNB in case of conditional reconfiguration for CPC). In this case, the SN sets the RRCReconfiguration message in accordance with clause 6 e.g. regarding the "Need" or "Cond" statements.

or

- including the current SCG configuration of the UE, when provided in response to a query from MN, or in SN triggered SN change in order to enable delta signaling by the target SN. In this case, the SN sets the RRCReconfiguration message in accordance with clause 11.2.3.

The field is absent if neither SCG (re)configuration nor SCG configuration query nor SN triggered SN change is performed, e.g. at inter-node capability/configuration coordination which does not result in SCG (re)configuration towards the UE. This field is not applicable in NE-DC.

Thus, the field scg-CellGroupConfig of CG-Config (included in the S-NODE ADDITION REQUEST ACKNOWLEDGE message sent from the candidate T-SN 40 to the MN 20) is set to the RRCReconfiguration i.e. the reconfiguration of the target candidate SCG (to be stored upon reception at the UE 30**, but only applied upon fulfilment of the execution condition).

An example procedure at the MN 20 for building an RRCReconfiguration to the UE 30 including CPA configuration(s) with SCG configuration provided by SN 40 candidate(s) is described below.

At step 3 of the example embodiment of FIG. 4, upon reception of the acknowledge message (S-NODE ADDITION REQUEST ACKNOWLEDGE) from the target candidate SN 40, the MN 20 generates a new RRC Reconfiguration message (e.g., denoted RRCReconfiguration) to be provided to the UE 30. That new RRC Reconfiguration message (RRCReconfiguration created/generated by the MN 20) contains at least a conditional reconfiguration (e.g., field conditionalReconfiguration and/or IE ConditionalReconfiguration for CPA). This RRC Reconfiguration message (e.g., denoted RRCReconfiguration) is in MN format. For example, if the UE 30 is in an inter-RAT DC mode, like EN-DC (LTE MN and NR SN), this would be an LTE RRC message, like an RRCConnectionReconfiguration, as defined in 3GPP TS 36.331.

In certain embodiments, the conditional reconfiguration comprises at least one of the following:

For each target candidate (i.e., target candidate PSCell), another RRC Reconfiguration in MN format also generated by the MN 20 (e.g. denoted RRCReconfiguration*)

If the MN 20 is an LTE node (e.g., for a UE in EN-DC), that message can be an RRCConnectionReconfiguration*

Within that message, the MN 20 includes the RRC Reconfiguration generated by the target candidate SN 40 (e.g., denoted RRCReconfiguration**). That message is in SN format.

The UE 30 is to apply the RRCReconfiguration* upon fulfilment of the condition and, as RRCReconfiguration is inside as an SCG reconfiguration (e.g., field nr-SCG) the UE also applies the RRCReconfiguration in SN format (i.e., performing actions upon according to the SN RRC specifications);

This RRCReconfiguration* message could be referred to as a wrapper message, and may not contain any MCG/MN-related configurations, except the SCG container for the SCG RRC Reconfiguration (i.e. RRCReconfiguration). One reason to have such a wrapper is to simplify the RRC procedures so that upon applying it the UE 30 may be able to execute procedures associated to other RAT: if message is in SN format, like a message coming from an SN 40 that is an LTE node while the UE 30** is connected to NR, or vice versa.

An execution condition associated to it (e.g., pointing to one or multiple MeasId(s)).

In addition, in certain embodiments, the new RRC Reconfiguration message (RRCReconfiguration created by the MN 20 and in MN format) may contain a measurement configuration associated to the measId(s) for conditional reconfiguration i.e. having conditional reconfiguration as report Type. That is to be applied upon reception i.e. when the UE 30 is being configured with CPA during preparation.

When generating of the new RRC message MN 20 generates the field conditionalReconfiguration of IE ConditionalReconfiguration, as follow % s below. One distinguishable aspect here is that it is the MN 20 that generates the RRC message with the conditional reconfiguration and the conditional reconfiguration is for a PSCell Addition:

RRCReconfiguration message

```
-- ASN1START
-- TAG-RRCRECONFIGURATION-START
. . .
RRCReconfiguration-IEs :=            SEQUENCE {
   radioBearerConfig                    RadioBearerConfig
OPTIONAL, -- Need M
   secondaryCellGroup                       OCTET STRING (CONTAINING
CellGroupConfig)                            OPTIONAL, -- Need M
   measConfig                       MeasConfig
OPTIONAL, -- Need M
   lateNonCriticalExtension                    OCTET STRING
OPTIONAL,
   nonCriticalExtension                  RRCReconfiguration-v1530-IEs
OPTIONAL
}
RRCReconfiguration-v16xy-IEs                     SEQUENCE {
   otherConfig-v16xy                OtherConfig-v16xy                OPTIONAL,
-- Need M
   bap-Config-r16                 SetupRelease { BAP-Config-r16 }
OPTIONAL, -- Need M
   conditionalReconfiguration-r16                 ConditionalReconfiguration-r16
OPTIONAL, -- Need M
   daps-SourceRelease-r16                    ENUMERATED {true}
OPTIONAL, -- Need N
   sl-ConfigDedicatedNR-r16                   SetupRelease {SL-ConfigDedicatedNR-r16}
OPTIONAL, -- Need M
   sl-ConfigDedicatedEUTRA-r16                   SetupRelease {SL-
ConfigDedicatedEUTRA-r16} OPTIONAL, -- Need M
   nonCriticalExtension                  SEQUENCE { }               OPTIONAL,
}
-- TAG-RRCRECONFIGURATION-STOP
-- ASN1STOP
```

conditionalReconfiguration
Configuration of candidate target SpCell(s) and execution condition(s) for conditional handover or conditional PSCell change. For conditional PSCell change, this field may ~~only~~ be present in an RRCReconfiguration message for intra-SN PSCell change or PSCell addition. The network does not configure a UE with both conditional PCell change and conditional PSCell change simultaneously. The field is absent if any DAPS bearer is configured or if the masterCellGroup includes ReconfigurationWithSync. For conditional PSCell change, the field is absent if the secondaryCellGroup includes ReconfigurationWithSync.
. . .

ConditionalReconfiguration information element

```
-- ASN1START
-- TAG-CONDITIONALRECONFIGURATION-START
ConditionalReconfiguration-r16 :=            SEQUENCE {
   attemptCondReconfig-r16                   ENUMERATED {true}        OPTIONAL,
-- Cond PCell
   condReconfigToRemoveList-r16                   CondReconfigToRemoveList-r16
OPTIONAL, -- Need N
   condReconfigToAddModList-r16                   CondReconfigToAddModList-r16
OPTIONAL, -- Need N
...
}
CondReconfigToRemoveList-r16 ::=            SEQUENCE (SIZE (1 ..
maxNrofCondCells-r16)) OF CondReconfigId-r16
-- TAG-CONDITIONALRECONFIGURATION-STOP
-- ASN1STOP
```

| ConditionalReconfiguration field descriptions |
|---|
| . . .<br>condReconfigToAddModList<br>List of the configuration of candidate SpCells to be added or modified for CHO or CPC.<br>. . . |

CondReconfigToAddModList information element

```
-- ASN1START
-- TAG-CONDRECONFIGTOADDMODLIST-START
CondReconfigToAddModList-r16 ::= SEQUENCE (SIZE (1 .. maxNrofCondCells-
r16)) OF CondReconfigToAddMod-r16
CondReconfigToAddMod-r16 ::=          SEQUENCE {
   condReconfigId-r16                CondReconfigId-r16,
   condExecutionCond-r16              SEQUENCE (SIZE (1..2)) OF MeasId
OPTIONAL,   -- Cond condReconfigAdd
   condRRCReconfig-r16                OCTET STRING (CONTAINING
RRCReconfiguration)   OPTIONAL   ,-- Cond condReconfigAdd
   ...
}
-- TAG-CONDRECONFIGTOADDMODLIST-STOP
-- ASN1STOP
```

| CondReconfigToAddMod field descriptions |
|---|
| condExecutionCond<br>The execution condition that needs to be fulfilled in order to trigger the execution of a conditional reconfiguration. When configuring 2 triggering events (MeasId's) for a candidate cell, network ensures that both refer to the same measObject.<br>condRRCReconfig<br>The RRCReconfiguration message to be applied when the condition(s) are fulfilled. The RRCReconfiguration message contained in condRRCReconfig cannot contain the field conditionalReconfiguration. |

For each candidate PSCell (i.e., target candidate PSCell) the MN 20 generates an RRC Reconfiguration (e.g., denoted RRCReconfiguration*) message in MN format. Inside that RRCReconfiguration* message the MN 20 sets the SCG configuration to be the SCG RRC Reconfiguration received by the target candidate SN 40 associated to the target candidate PSCell; for example, the MN 20 sets the nr-SCG field of RRCReconfiguration* to the RRCReconfiguration received from the target candidate SN 40. Then, in the RRC Reconfiguration message in MN format to be send to the UE 30**, it sets per candidate the condRRCReconfig to the RRCReconfiguration*. The nest structure can be something as shown below:

- RRCReconfiguration (MN format): message to be sent to the UE 30 and applied upon reception;
  - Conditional Reconfiguration: applied upon reception;
    - RRCReconfiguration* (MN format): applied upon execution fulfillment, leads to the creation of an RRCReconfigurationComplete* to be sent to the MN 20 by the UE 30;
      - nr-SCG set to RRCReconfiguration (SN format): applied upon execution fulfillment, leads to the creation of an RRCReconfigurationComplete to be sent to the MN 20 by the UE 30 within the RRCReconfigurationComplete*; that RRCReconfigurationComplete is then forwarded by the MN 20 to the target SN 40 associated to the PSCell candidate the UE 30** has performed CPA execution;

Although nr-SCG is used as an example in this description, it is worth highlighting that if the SN is from another RAT, like LTE, the eutra-SCG field could be used:

```
MRDC-SecondaryCellGroupConfig ::=          SEQUENCE {
   mrdc-ReleaseAndAdd                    ENUMERATED {true}
OPTIONAL, -- Need N
   mrdc-SecondaryCellGroup                 CHOICE {
      nr-SCG                          OCTET STRING (CONTAINING
RRCReconfiguration),
      eutra-SCG                         OCTET STRING
   }
}
```

In a particular embodiment, the MN 20 sets the condRRCReconfig field (or equivalent) to be included in CondReconfigToAddModList (for the target candidate cell associated to the target SN candidate for CPA) to the RRCReconfiguration*, generated by the MN 20 and including in its SCG/MR-DC configuration the RRCReconfiguration generated by the target candidate SN 40** (e.g. where that is set to the field nr-SCG or eutra-SCG). If there have been multiple target candidate cells (from the same or different SN(s)), that step is repeated for each candidate cell.

In a particular embodiment, the MN 20 sets the condExecutionCond (one or multiple MeasId(s)) based on an MCG measurement configuration is either already configured to the UE 30. Or, alternatively, that measurement configuration can be a measConfig field of IE MeasConfig included in the same RRC Reconfiguration including the conditional reconfiguration e.g. for CPA. That measConfig contains the measId(s) later referred in the execution condition, which are associated to a measurement object (in the frequency of the target candidate SCG) and whose reportType in reportConfig of IE ReportConfigNR is set to condTriggerConfig of IE CondTriggerConfig.

Since this condition is supposed to be used for CPA, and not for conditional handover or CPC, according to certain embodiments described herein, a new event is defined (in addition to the condEventA3 and condEventA5), defined in R16. In a particular embodiment, for example, the new event could be called condEventA4: Neighbour (in different frequency than PCell frequency) becomes better than absolute threshold, as shown below:

```
ReportConfigNR ::=                SEQUENCE {
  reportType                    CHOICE {
    periodical                    PeriodicalReportConfig,
    eventTriggered                    EventTriggerConfig,
    ....,
    reportCGI                     ReportCGI,
    reportSFTD                        ReportSFTD-NR,
    condTriggerConfig-r16                 CondTriggerConfig-r16,
    cli-Periodical-r16                CLI-PeriodicalReportConfig-
                    r16,
    cli-EventTriggered-r16                CLI-EventTriggerConfig-r16
  }
}
CondTriggerConfig-r16 :=        SEQUENCE {
  condEventId                   CHOICE {
    condEventA3                   SEQUENCE {
      a3-Offset                 MeasTriggerQuantityOffset,
      hysteresis                Hysteresis,
      timeToTrigger                 TimeToTrigger
    },
    condEventA5                   SEQUENCE {
      a5-Threshold1                 MeasTriggerQuantity,
      a5-Threshold2                 MeasTriggerQuantity,
      hysteresis                Hysteresis,
      time ToTrigger                TimeToTrigger
    },
    ....,
    condEventA4                   SEQUENCE {
      a4-Threshold                      MeasTriggerQuantity,
      hysteresis                    Hysteresis,
      timeToTrigger                     TimeToTrigger,
    },
  },
  rsType-r16                    NR-RS-Type,
  ...
}
```

According to certain embodiments, the network may also configure up to 2 measId(s) possibly associated to the same conditional event A4 (condEventA4) i.e. two measIds associated to the same reportConfig for which condEventA4 is configured, but one associated to a trigger quantity set to be RSRP, and another associated to a trigger quantity set to be RSRQ, for example. In this manner, the UE 30 could add a PSCell only if that PSCell is better than an RSRP absolute threshold AND that PSCell is better than an RSRQ absolute threshold, in a particular embodiment.

According to certain other embodiments, the network configures the condEventA5 event for CPA. The event is considered fulfilled if PCell/PSCell becomes worse than absolute threshold1 AND Conditional reconfiguration candidate becomes better than another absolute threshold2 If this approach is to be used for CPA, network can set the absolute threshold1 for the PCell to a value equivalent to infinite so that the condition is always fulfilled (i.e. PCell is always worse than 'infinite'). Upon that configuration the UE 30 may avoid evaluating the first part of the condition and interpret it as an indication from the network that only the second part of the rule matters, i.e. the condition for the threshold2.

In both options, the associated measurement object is the one associated to the frequency the MN 20 wants to add the SCG on.

After generating the RRCReconfiguration message the MN 20 sends the message to the UE 30.

At step 4 of the example embodiment of FIG. 4, upon applying the message, the UE 30 configures the conditional reconfiguration (i.e., start the monitoring of execution condition(s) and store the RRC Reconfiguration for each target candidate PSCell. For example, the UE 30 may store per target candidate an RRCReconfiguration* that has an SCG configuration for the target candidate PSCell (e.g. nr-SCG=RRCReconfiguration** with a reconfiguration With Sync).

According to certain embodiments, the method may include how the UE 30 determines the applicable cell to be monitored for an execution condition associated to an RRCReconfiguration* message. A distinguishable aspect is that the execution conditions are monitored for a conditional PSCell Addition. According to previous approaches, for each condReconfigId within the VarConditionalReconfig, the UE 30 considers the cell which has a physical cell identity matching the value indicated in the ServingCellConfigCommon included in the reconfigurationWithSync in the received condRRCReconfig to be applicable cell. By contrast, according to certain methods and embodiments described herein, as a new nested structure is introduced, in the MN-initiated CPA (or simply called CPA) the UE considers the cell which has a physical cell identity matching the value indicated in the ServingCellConfigCommon included in the reconfigurationWithSync in the nr-SCG received in the condRRCReconfig to be applicable cell.

An example is shown in RRC for this first loop where CPA is configured at the UE:

//loop 1: UE gets configured with CPA i.e. receives message in MN format and starts monitoring //conditions based on MN/MCG measConfig

. . .

5.3.5.3 Reception of an RRCReconfiguration by the UE

The UE shall perform the following actions upon reception of the RRCReconfiguration. or upon execution of the conditional reconfiguration (CHO or CPC):

. . .

1> if the RRCReconfiguration message includes the measConfig:

2> perform the measurement configuration procedure as specified in 5.5.2;

. . .

1> if the RRCReconfiguration message includes the conditionalReconfiguration:

2> perform conditional reconfiguration as specified in 5.3.5.13;

. . .

1> set the content of the RRCReconfigurationComplete message as follows:

. . .

1> else (RRCReconfiguration was received via SRB1):

2> submit the RRCReconfigurationComplete message via SRB1 to lower layers for transmission using the new configuration;

2> if this is the first RRCReconfiguration message after successful completion of the RRC re-establishment procedure:

3> resume SRB2 and DRBs that are suspended:

. . .

5.3.5.13 Conditional Reconfiguration 5.3.5.13.1 General

. . .

The UE performs the following actions based on a received ConditionalReconfiguration IE:

. . .

1> if the ConditionalReconfiguration contains the condReconfigAddModList:

2> perform conditional reconfiguration addition/modification as specified in 5.3.5.13.3.

. . .

5.3.5.13.3 Conditional Reconfiguration Addition/Modification

For each condReconfigId received in the condReconfigToAddModList IE the UE shall:

. . .

1> else:

2> add a new entry for this condReconfigId within the VarConditionalReconfig;

1> perform conditional reconfiguration evaluation as specified in 5.3.5.13.4:

5.3.5.13.4 Conditional Reconfiguration Evaluation

The UE shall:

1> for each condReconfigId within the VarConditionalReconfig:

2> consider the cell which has a physical cell identity matching the value indicated in the ServingCellConfigCommon included in the reconfigurationWithSync in the received condRRCReconfig to be applicable cell; or 2> consider the cell which has a physical cell identity matching the value indicated in the ServingCellConfigCommon included in the reconfigurationWithSync in the nr-SCG received in the condRRCReconfig to be applicable cell; or 2> consider the cell which has a physical cell identity matching the value indicated in the ServingCellConfigCommon included in the reconfigurationWithSync in the eutra-SCG received in the condRRCReconfig to be applicable cell;

2> for each measId included in the measIdList within VarMeasConfig indicated in the condExecutionCond associated to condReconfigId:

3> if the entry condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:

4> consider the event associated to that measId to be fulfilled;

3> if the leaving condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:

4> consider the event associated to that measId to be not fulfilled:

In response to the configuration, the UE 30 generates a complete message in response to the MN 20.

At this point, one can consider that conditional reconfiguration is configured (preparation phase). Thus, the UE 30 monitors the execution conditions, the candidate target SN (T-SN) 40 is/are prepared, and the MN 20 receives acknowledgement that the UE 30 has successfully applied conditional reconfiguration.

After the UE 30 is configured with conditional reconfiguration, the UE 30 starts to monitor the execution condition(s) associated to the target candidate's RRC Reconfiguration.

At step 5 of the example embodiment of FIG. 4, upon fulfilment of the condition, the UE 30 first applies the RRC reconfiguration in MN format (RRCReconfiguration*) and, while that is being applied, the UE 30 finds the NR SCG configuration. For example, the UE 30 may find the NR SCG configuration in the nr-SCG field or an equivalent in case the SCG is LTE or in case of EN-DC. In other words, the UE 30 also applies the associated target candidate's RRC Reconfiguration (e.g. RRCReconfiguration**).

As part of that, the UE 30 generates two complete messages. For example, the UE 30 generates a RRCReconfigurationComplete message to acknowledge the candidate SN 40 that the UE 30 has successfully applied the target candidate's RRC Reconfiguration (e.g. RRCReconfiguration). The UE 30 also generates an RRCReconfigurationComplete* message (in MN format), which is included within RRCReconfigurationComplele* and is submitted to lower layers for transmission via the MN 20.

According to certain embodiments, the RRCReconfiguration* message in MN format may also contain MN/MCG related configuration(s), such as radio bearer configuration(s) that are to be applied only upon execution. For example, when CPA is executed, the intent could be that a bearer such as, for example, a SN-terminated bearer is added, removed, or modified or a MN-terminated bearer may be re-configured or released.

In a particular embodiment, the method may also include a possible rule enabling the UE 30 to distinguish between the case where the SCG configuration is applied for a CPA configuration compared to a legacy CPC configuration so that, based on the distinction, the UE 30 determines how to transmit the complete message associated to the SCG RRC reconfiguration that is applied leading to a PSCell addition:

In legacy RRC, if the RRCReconfiguration message was received via SRB1 within the nr-SCG within mrdc-SecondaryCellGroup (UE in NR-DC, mrdc-SecondaryCellGroup was received in RRCReconfiguration via SRB1), AND if the RRCReconfiguration is applied due to a conditional reconfiguration execution, the UE submit the RRCReconfigurationComplete message via the NR MCG embedded in NR RRC message ULInformationTransferMRDC as specified in clause 5.7.2a.3;

However, according to the method, the UE 30 only submits the RRCReconfigurationComplete message via the NR MCG embedded in NR RRC message ULInformationTransferMRDC as specified in clause 5.7.2a.3, if the RRCReconfigurationComplete** has not been included in an nr-SCG-Response (within RRCReconfigurationComplete) and has not been transmitted yet;

The basic principle here is that the UE 30 prevents the transmission of the RRCReconfigurationComplete** twice, via the RRCReconfigurationComplete* and via the ULInformationTransferMRDC; And only transmits via the RRCReconfigurationComplete*.

//loop 2: UE applies RRCReconfiguration*, which includes nr-SCG=RRCReconfiguration**

5.3.5.13 Conditional Reconfiguration

. . .

5.3.5.13.4 Conditional Reconfiguration Evaluation

The UE shall:

3> initiate the conditional reconfiguration execution, as specified in 5.3.5.13.5;

. . .

5.3.5.13.5 Conditional Reconfiguration Execution

The UE shall:

1> if more than one triggered cell exists:

2> select one of the triggered cells as the selected cell for conditional reconfiguration execution;

1> for the selected cell of conditional reconfiguration execution: 2> apply the stored condRRCReconfig of the selected cell and perform the actions as specified in 5.3.5.3;

. . .

5.3.5.3 Reception of an RRCReconfiguration by the UE

The UE shall perform the following actions upon reception of the RRCReconfiguration. or upon execution of the conditional reconfiguration (CHO or CPC):

. . .

1> if the RRCReconfiguration includes the mrdc-SecondaryCellGroupConfig:

2> if the mrdc-SecondaryCellGroupConfig is set to setup:

. . .

3> if the received mrdc-SecondaryCellGroup is set to nr-SCG:

4> perform the RRC reconfiguration according to 5.3.5.3 for the RRCReconfiguration message included in nr-SCG;

. . .

1> set the content of the RRCReconfigurationComplete message as follows:

. . .

2> if the RRCReconfiguration message includes the mrdc-SecondaryCellGroupConfig with mrdc-SecondaryCellGroup set to nr-SCG:

3> include in the nr-SCG-Response the RRCReconfigurationComplete message;

. . .

. . .

1> else (RRCReconfiguration was received via SRB1):

2> submit the RRCReconfigurationComplete message via SRB1 to lower layers for transmission using the new configuration;

2> if this is the first RRCReconfiguration message after successful completion of the RRC re-establishment procedure:

3> resume SRB2 and DRBs that are suspended;

//loop 3: UE applies nr-SCG=RRCReconfiguration**

5.3.5.3 Reception of an RRCReconfiguration by the UE

The UE shall perform the following actions upon reception of the RRCReconfiguration. or upon execution of the conditional reconfiguration (CHO or CPC):

. . .

1> if the RRCReconfiguration includes the secondaryCellGroup:

2> perform the cell group configuration for the SCG according to 5.3.5.5;

. . .

1> set the content of the RRCReconfigurationComplete message as follows:

. . .

1> else if the RRCReconfiguration message was received via SRB1 within the nr-SCG within mrdc-SecondaryCellGroup (UE in NR-DC, mrdc-SecondaryCellGroup was received in RRCReconfiguration via SRB11):

2> if the RRCReconfiguration is applied due to a conditional reconfiguration execution:

3> if the RRCReconfigurationComplete has not been included in an nr-SCG-Response and has not been transmitted:

4> submit the RRCReconfigurationComplete message via the NR MCG embedded in NR RRC message ULInformationTransferMRDC as specified in clause 5.7.2a.3.

2> if reconfigurationWithSync was included in spCellConfig in nr-SCG:

3> initiate the Random Access procedure on the PSCell, as specified in TS 38.321 [3];

2> else

3> the procedure ends:

. . .

1> if reconfigurationWithSync was included in spCellConfig of an MCG or SCG, and when MAC of an NR cell group successfully completes a Random Access procedure triggered above:

2> stop timer T304 for that cell group;

2> stop timer T310 for source SpCell if running;

. . .

2> if the reconfigurationWithSync was included in spCellConfig of an MCG; or:

2> if the reconfigurationWithSync was included in spCellConfig of an SCG and the CPC was configured 3> remove all the entries within VarConditionalReconfig, if any;

3> for each measId of the source SpCell configuration, if the associated reportConfig has a reportType set to condTriggerConfig:

4> for the associated reportConfigId:

5> remove the entry with the matching reportConfigId from the reportConfigList within the VarMeasConfig:

4> if the associated measObject/d is only associated to a reportConfig with reportType set to cho-TriggerConfig:

5> remove the entry with the matching measObject/d from the measObjectList within the VarMeasConfig:

4> remove the entry with the matching measId from the measIdList within the VarMeasConfig;

At step 6 of the example embodiment of FIG. 4, upon receiving the complete message from the UE 30, the MN 20 determines to which target candidate SN node 40 is to send the complete message (e.g. RRCReconfigurationComplete**).

In a particular embodiment, for example, the UE 30 may include an indication in the complete message. For example, the indication may be a cell identity for the cell for which conditional reconfiguration has been executed. As another example, the indication may be a conditional reconfiguration identity. In such embodiments, the MN 20 maintains a mapping between a reported identifier and the target candidate SN ID that should receive the complete message.

According to another particular embodiment, the MN 20 may inform the target SN 40 via an RRC TRANSFER message with the RRCReconfigurationComplete embedded.

In still another embodiment, the MN 20 may inform the target SN 40 via S-NODE RECONFIGURATION COMPLETE or SgNB Reconfiguration Complete message with the encoded NR RRC response message for the target SN 40 if received from the UE 30.

At step 7 of the example embodiment of FIG. 4, the UE 30 performs random access procedure with the target candidate cell that has been selected during conditional reconfiguration execution.

At step 8 of the example embodiment of FIG. 4, the source SN 40 freezes PDCP and sends the uplink PDCP SN and HFN receiver status and the downlink PDCP SN and HFN transmitter status to the MN 20 in a SN STATUS TRANSFER message. The MN 20 forwards these status to one of the target candidate SNs 40 (i.e. the one the UE has accessed) in a SN STATUS TRANSFER message.

According to certain other embodiments for CPA, an alternative solution may include the SN 40 building or generating the conditional reconfiguration for CPA. In this solution, the SN 40 creates the conditional reconfiguration in the RRC message.

Figure 5A:
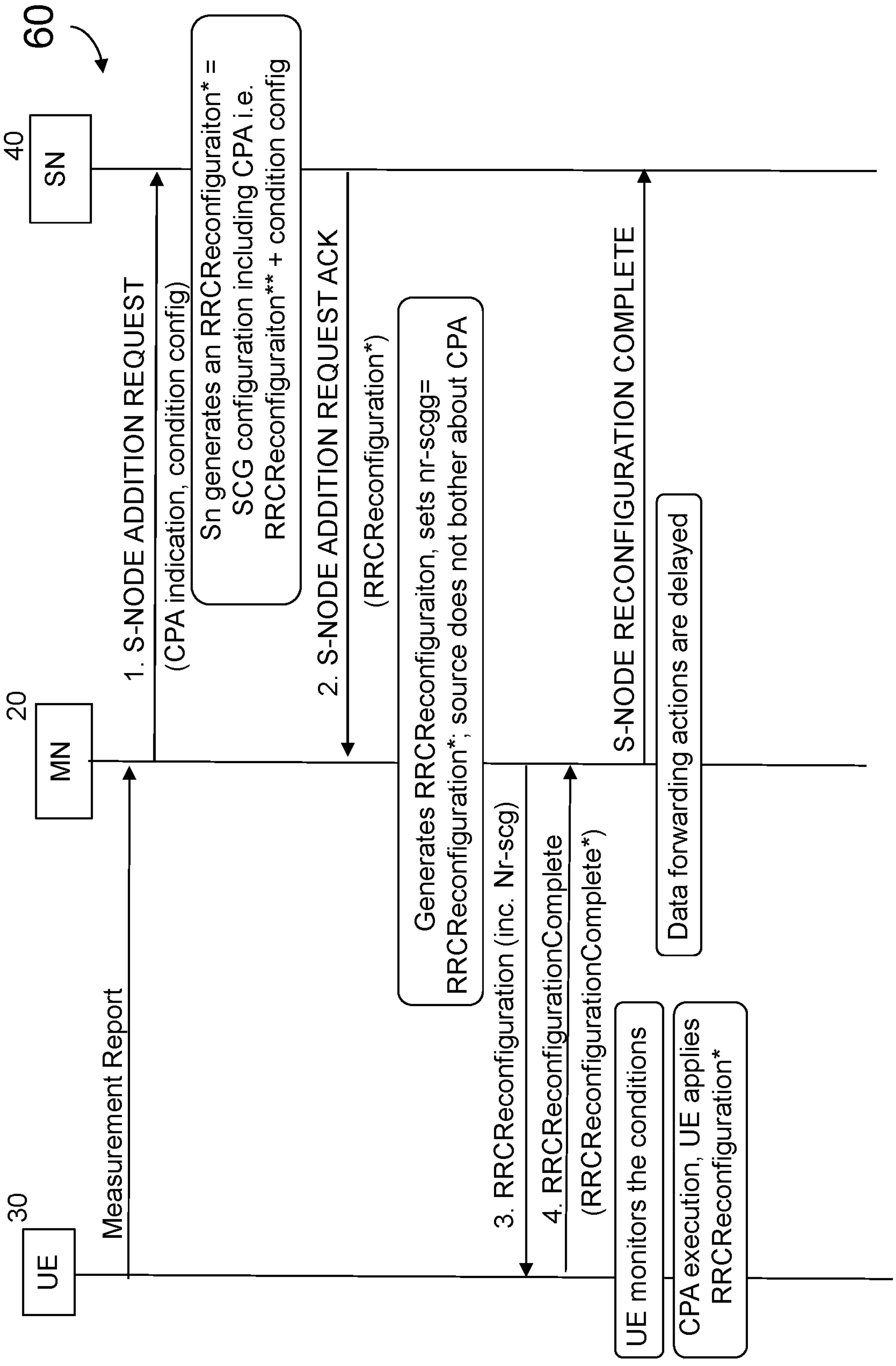
FIGS. 5A-5B illustrates an example signalling diagram of CPA in which the SN defines the conditions, according to certain embodiments.
Figure 5B:
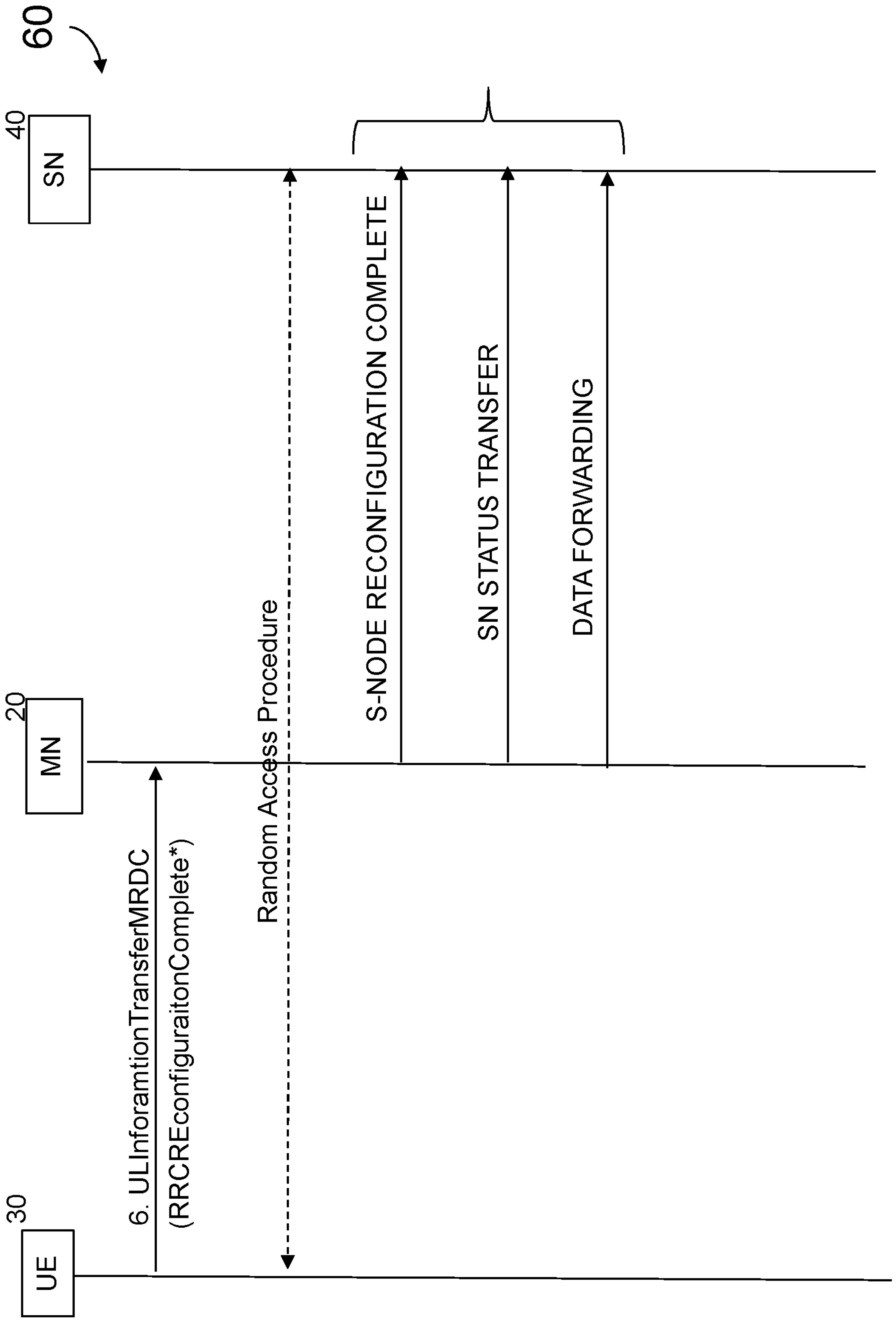

FIGS. 5A-5B illustrate an example signaling diagram 60 for CPA in which the SN defines the conditions, according to certain embodiments.

At step 1 of the example embodiment of FIG. 6A, the node operating as Master Node (MN) 20 for a UE 30 operating in MR-DC decides to configure CPA for the UE 30 based on, for example, measurements reports received from the UE 30. Upon determining to configure CPA, the MN sends to the T-SN 40 an S-NODE ADDITION REQUEST message including an indication that the request is for CPA (i.e., it is not for a PSA to be performed immediately as in previous approaches for PSA) The S-NODE ADDITION REQUEST message also contains information regarding the execution condition(s) to be considered when the SN 40 generates the CPA configuration. According to particular embodiments, that may be, for example:

- An indication of which cent or cents to be used such as condEventA3, condEventA5, condEventA4 or combinations condEventA4 (RSRP) AND condEventA4 (RSRQ); and/or
- Configuration for the event or events e.g. thresholds, timer to trigger values, hysteresis values, etc.
- Measurement identifier or Measurement identifiers associated to a measConfig (possibly provided from the MN to the SN, if it is something that is provided to the UE or that is to be provided to the UE by the MN).

At step 2 of the example embodiment of FIG. 6A, the node operating as candidate SN (candidate T-SN) 40 sends to the MN 20 an S-NODE ADDITION REQUEST ACKNOWLEDGE message, including an RRC Reconfiguration message (e.g., RRCReconfiguration*), which includes the CPA configuration generated by the SN 40 and to be applied upon reception by the UE 30. Within the CPA configuration, the SN 40 includes the execution condition(s), i.e., one or a number of MeasID(s), and the SCG RRC reconfiguration for each PSCell candidate e.g. RRCReconfiguration** to be applied only upon fulfilment of the condition.

In a particular embodiment, the RRC Reconfiguration (RRCReconfiguration*) can be, for example, included in an RRC container like the CG-Config and is understood by the MN 20 that this is to be provided to the UE 30 so the UE 30 applies upon reception:

S-Node Addition Request Acknowledge

This message is sent by the S-NG-RAN node to confirm the M-NG-RAN node about the S-NG-RAN node addition preparation (or S-NG-RAN node addition preparation for Conditional reconfiguration).

Direction: S-NG-RAN node→M-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | M | | NG-RAN node UE XnAP ID 9.2.3.16 | Allocated at the S-NG-RAN node | YES | reject |
| . . . | . . . | | . . . | | . . . | |
| S-NG-RAN node to M-NG-RAN node Container | M | | OCTET STRING | Includes the CG-Config message as defined in subclause 11.2.2 of TS 38.331 [10]. Note: in the example above this is includes the RRCReconfiguration** generated by the target candidate SN. | YES | reject |
| Location Information at S-NODE | O | | Target Cell Global ID 9.2.3.25 | Contains information to support localisation of the UE | YES | ignore |
| MR-DC Resource | O | | 9.2.2.33 | Information used to | YES | ignore |

-continued

| IE/Group Name | Presence | Range | IE type and reference | Semantics description | Criticality | Assigned Criticality |
|---|---|---|---|---|---|---|
| Coordination Information | | | | coordinate resource utilisation between M-NG-RAN node and S-NG-RAN node. | | |

In case the T-SN 40 can prepare multiple target candidate cells, the IE within the message may contain multiple configurations for multiple candidate cells. Alternatively, that contains a list of containers for additional CG-config messages related to the additional candidate cells.

According to this step, the field scg-CellGroupConfig of CG-Config (included in the S-NODE ADDITION REQUEST ACKNOWLEDGE message sent from the candidate SN 40 to the MN 20) is set to the RRCReconfiguration*.

CG-Config message

```
-- ASN1START
-- TAG-CG-CONFIG-START
...
CG-Config-IEs ::=              SEQUENCE {
   scg-CellGroupConfig               OCTET STRING (CONTAINING
RRCReconfiguration)       OPTIONAL,
   scg-RB-Config                  OCTET STRING (CONTAINING
RadioBearerConfig)         OPTIONAL,
   configRestrictModReq              ConfigRestrictModReqSCG
OPTIONAL,
   drx-InfoSCG                 DRX-Info                     OPTIONAL,
   candidateCellInfoListSN           OCTET STRING (CONTAINING
MeasResultList2NR)        OPTIONAL,
   measConfigSN                  MeasConfigSN                   OPTIONAL,
   selectedBandCombination              BandCombinationInfoSN
OPTIONAL,
   fr-InfoListSCG              FR-InfoList                  OPTIONAL,
   candidateServingFreqListNR             Candidate ServingFreqListNR
OPTIONAL,
nonCriticalExtension              CG-Config-v1540-IEs
OPTIONAL,
}
MeasConfigSN ::=               SEQUENCE {
   measuredFrequenciesSN   SEQUENCE (SIZE (1 .. maxMeasFreqsSN)) OF
NR-FreqInfo OPTIONAL,
   ...
}
...
-- TAG-CG-CONFIG-STOP
-- ASN1STOP
```

...
scg-CellGroupConfig
Contains the RRCReconfiguration message (containing only secondaryCellGroup and/or measConfig):

- to be sent to the UE, used upon SCG establishment, modification or conditional reconfiguration for a target candidate SCG (e.g. CPA), as generated (entirely) by the (target) SgNB. In this case, the SN sets the RRCReconfiguration message in accordance with clause 6 e.g. regarding the "Need" or "Cond" statements.

or

- including the current SCG configuration of the UE, when provided in response to a query from MN, or in SN triggered SN change in order to enable delta signaling by the target SN. In this case, the SN sets the RRCReconfiguration message in accordance with clause 11.2.3.

The field is absent if neither SCG (re)configuration nor SCG configuration query nor SN triggered SN change is performed, e.g. at inter-node capability/configuration coordination which does not result in SCG (re)configuration towards the UE. This field is not applicable in NE-DC.

At step 3 of the example embodiment of FIG. 6A, upon reception of the acknowledge message (S-NODE ADDITION REQUEST ACKNOWLEDGE) from the candidate SN 40, the MN 20 generates a new RRC Reconfiguration message (e.g. denoted RRCReconfiguration) to be provided to the UE 30. This message is only a wrapper for the SN 40 generated message, especially to allow for inter-RAT DC mode, like EN-DC (LTE MN and NR SN), this would be an LTE RRC message.

After generating the wrapper RRCReconfiguration message the MN 20 sends the message to the UE 30. In other words, the message received by the MN 20 is set within the RRC Reconfiguration in MN format as an SCG RRC Reconfiguration to be applied upon reception by the UE 30. An example is shown below for the nested messages and IEs/fields:

- RRC Reconfiguration in MN format, generated by the MN 20;
  - nr-SCG set to RRCReconfiguration* received by the SN 40;
    - Conditional Reconfiguration (for CPA, generated by SN);
      - For each candidate PSCell, an RRCReconfiguration**;
      - For each candidate PSCell, execution condition configuration;
    - SCG measConfig possibly including the CPA related measurement configuration.

At step 4 of the example embodiment of FIG. 6A, upon applying the RRC Reconfiguration message (RRCReconfiguration), the UE 30 realizes that an SCG RRC Reconfiguration is included and applies it too (RRCReconfiguration*). Upon applying that, the UE 30 is configured with CPA. Specifically, the UE 30 configures the conditional reconfiguration (i.e. starts the monitoring of execution condition(s) and stores the RRC Reconfiguration for each target candidate PSCell). For example, the UE 30 may store per target candidate an RRCReconfiguration** that has an SCG configuration for the target candidate PSCell.

In response to the configuration, the UE 30 may generate a complete message in response to the MN 20, including a complete message associated to the SCG RRC Reconfiguration, that may be forwarded from the MN 20 to the SN 40 (as the SN has configured the UE 30 with CPA). In a particular embodiment, the SN 40 may be considered as a supporting function to the MN 20 and may be mainly used to generate the message in SN format. In that case, the MN 20 does not need to forward the complete message to the SN 40.

At this point, the conditional reconfiguration may be considered as configured. During this preparation phase, the UE 30 monitors the execution conditions, the candidate target SN (T-SN) 40 is/are prepared, and the MN 20 receives acknowledgement that the UE 30 has successfully applied conditional reconfiguration.

As noted above, after the UE 30 is configured with conditional reconfiguration, the UE 30 starts to monitor the execution condition(s) associated to the target candidate's RRC Reconfiguration.

At step 5 of the example embodiment of FIG. 6A, when the MN 20 receives the complete message for the conditional reconfiguration, the MN 20 sends an S-NODE RECONFIGURATION COMPLETE message to the SN 40 to confirm the configuration of the conditional reconfiguration. This step is part of option 2, but not option 1, as in option 1 it is the MN 20 that is responsible for the conditional reconfiguration.

At step 6 of the example embodiment of FIG. 6B, upon fulfilment of the condition, the UE 30 applies the RRC reconfiguration in SN format (RRCReconfiguration). As part of that, the UE 30 generates a complete message RRCReconfigurationComplete message that is meant for one of the candidate SN that becomes target SN 40 after execution. A difference here compared to certain methods described above is that there is no complete message for the MN 20 at execution as the MN 20 didn't build the message that is applied. The complete message to the SN 40 is sent via the MN 20 within a wrapper message, e.g. ULInformationTransfer. The complete message is forwarded to the SN 40 either within an RRCTransfer message or the SN 40 sends an S-NODE RECONFIGURATION COMPLETE message is sent to the SN 40. If SRB3 is configured, the UE 30 sends the complete message directly to the SN 40.

At step 7 of the example embodiment of FIG. 6B, the UE 30 performs random access procedure with the target candidate cell that has been selected during conditional reconfiguration execution.

At step 8 of the example embodiment of FIG. 6B, the source SN 40 freezes PDCP and sends the uplink PDCP SN and HFN receiver status and the downlink PDCP SN and HFN transmitter status to the MN 20 in a SN STATUS TRANSFER message. The MN 20 forwards these status to one of the target candidate SNs 40 (i.e. the one the UE 30 has accessed) in a SN STATUS TRANSFER message.

In an alternative embodiment, even though conditions are provided to the SN 40 possibly with measurements, it is up to the SN 40 to determine the candidate PSCell associated to a given SCG, based on the included measurement and/or other information internal to the SN 40, e.g. load, cell configurations, etc. In still another embodiment for CPA, the SN 40 is the node determining the execution conditions. In other words, the MN 20 in the SN Addition Request would not need to provide the configurations of execution conditions, but that would be determined by the SN 40, and set by the SN 40 in the CPA configuration to be provided to the UE 30.

Figure 6:
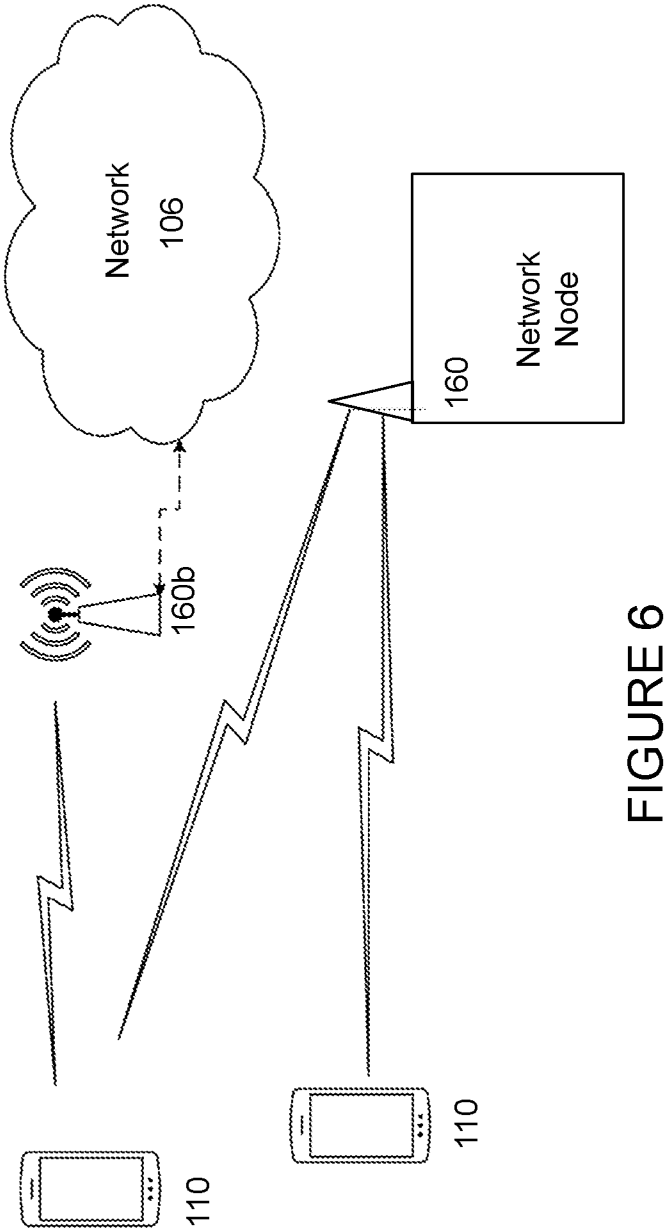
FIG. 6 illustrates an example wireless network, according to certain embodiments.

FIG. 6 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 106, network nodes 160 and 160*b*, and WDs 110. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 7:
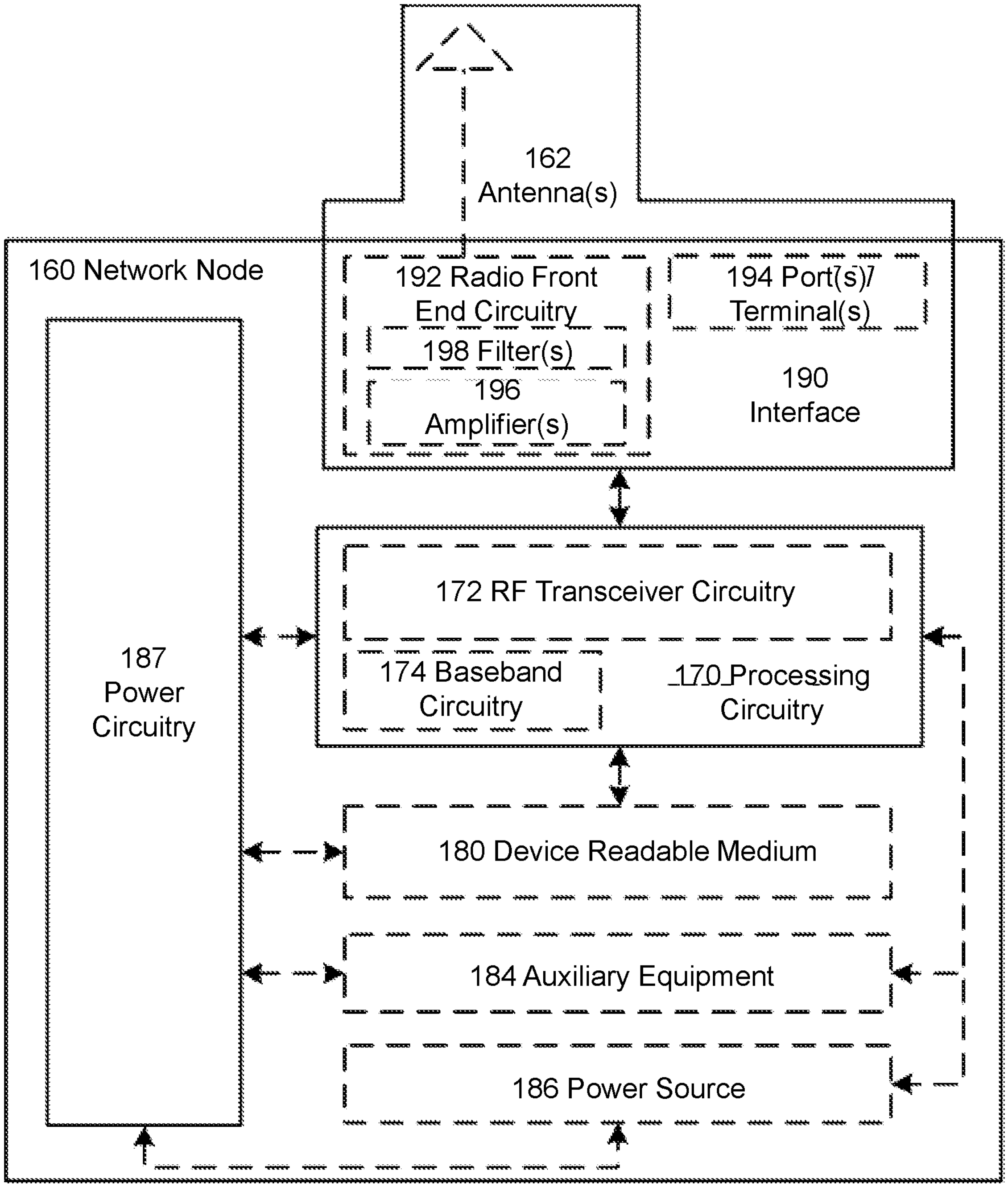
FIG. 7 illustrates an example network node, according to certain embodiments.

FIG. 7 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations. Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 160 includes processing circuitry 170, device readable medium 180, interface 190, auxiliary equipment 184, power source 186, power circuitry 187, and antenna 162. Although network node 160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA. LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 7 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 8:
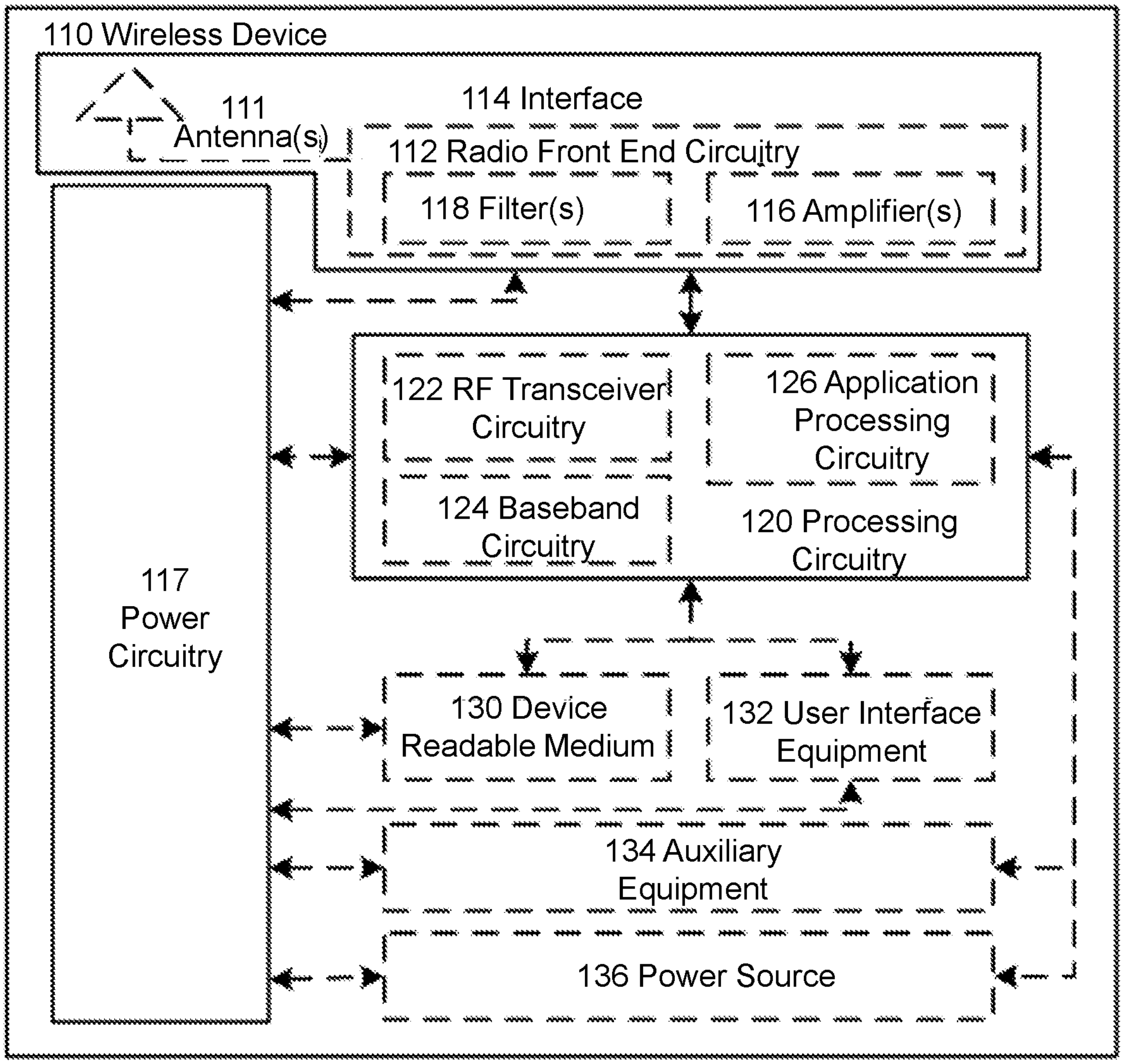
FIG. 8 illustrates an example wireless device, according to certain embodiments.

FIG. 8 illustrates an example wireless device 110, according to certain embodiments. As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA. LTE, NR. WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna Ill may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments. RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 9:
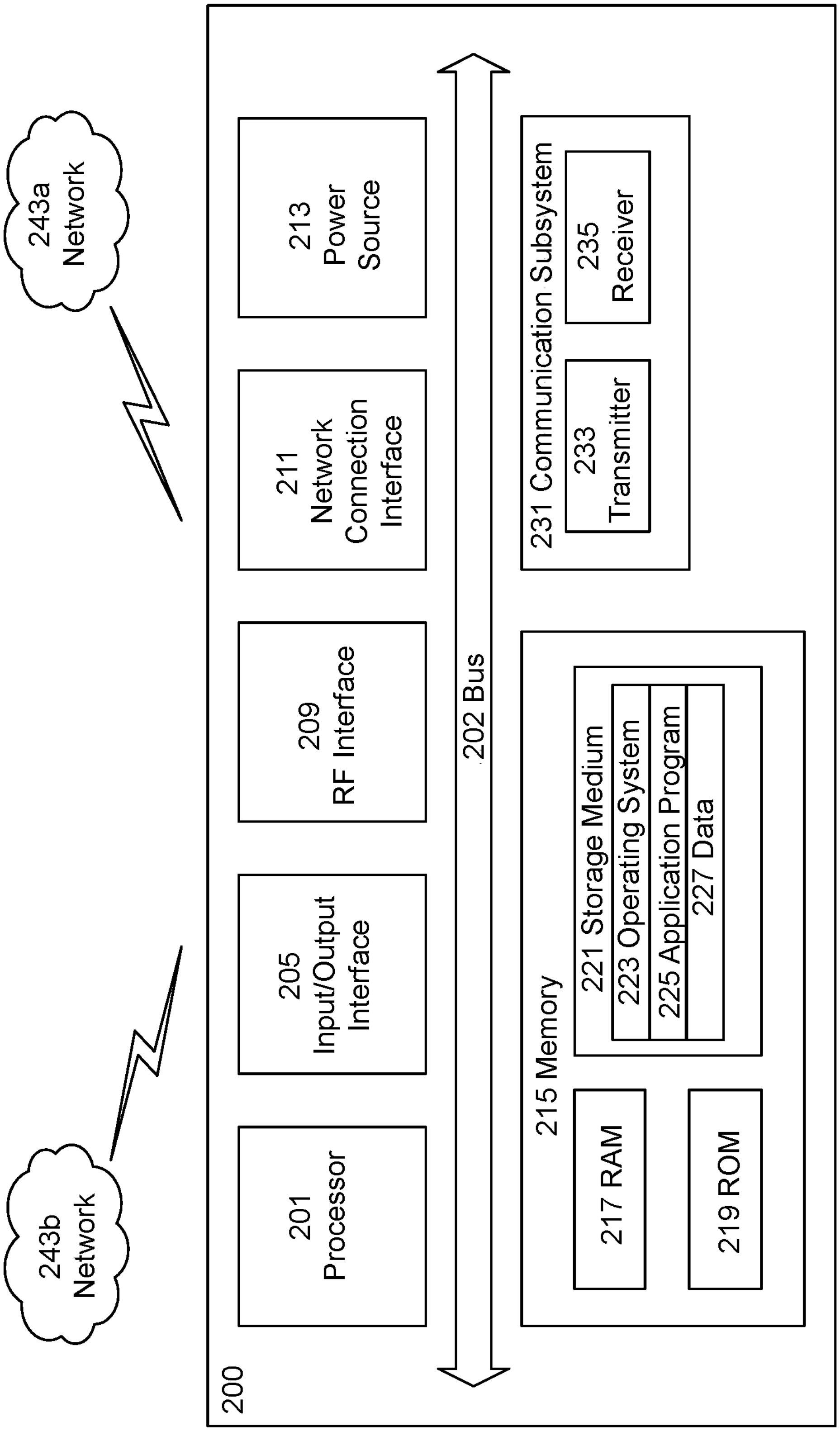
FIG. 9 illustrate an example user equipment, according to certain embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user A sensor may be, for instance, an accelerometer, a gyroscope, atilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 209 may be configured to provide a communication interface to RF components such as a transmitter, a receiver, and an antenna. Network connection interface 211 may be configured to provide a communication interface to network **243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211** may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM. ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 9, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2. CDMA, WCDMA, GSM, LTE, UTRAN, WiMax. or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 10:
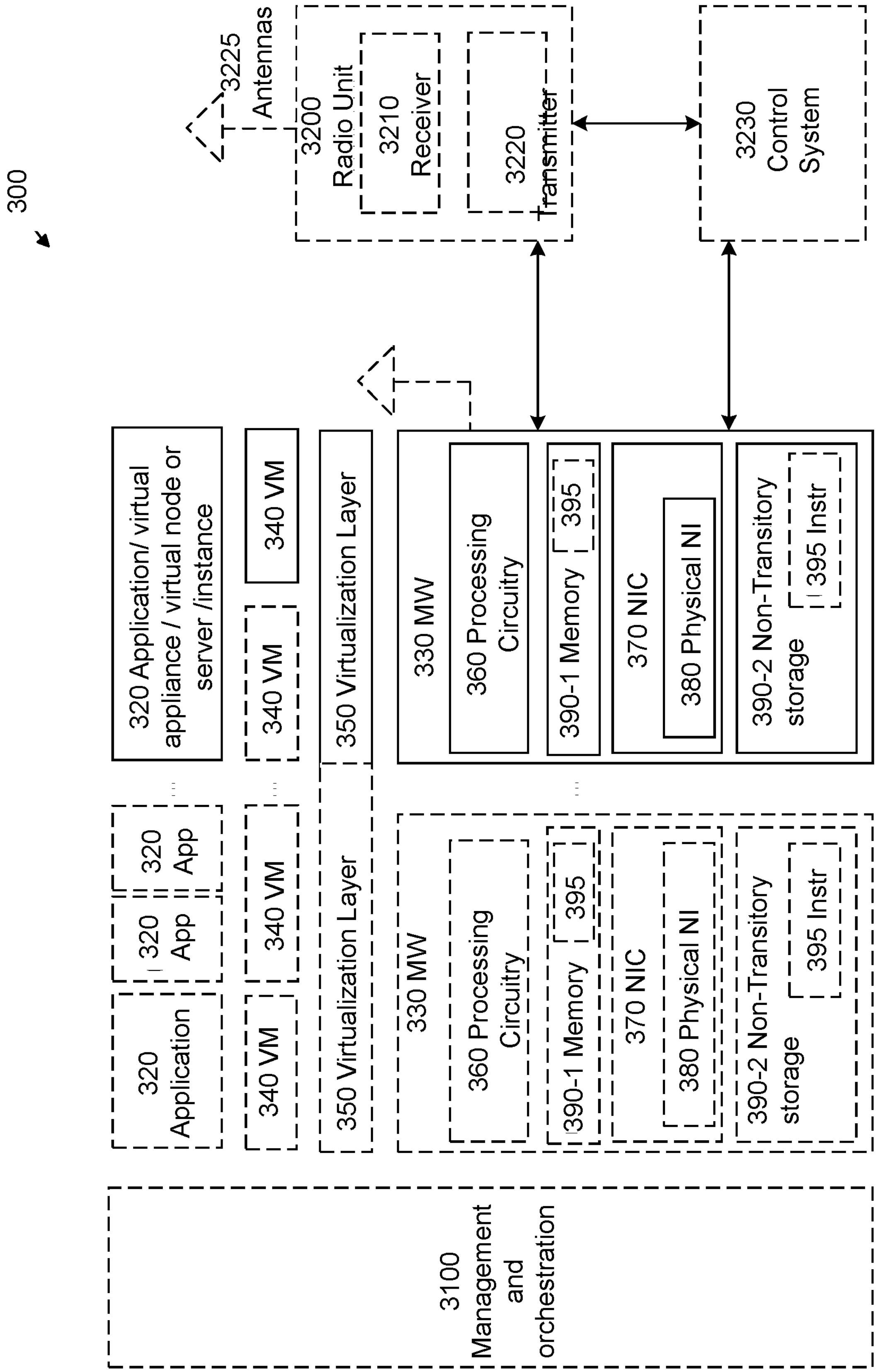
FIG. 10 illustrates a virtualization environment in which functions implemented by some embodiments may be virtualized, according to certain embodiments.

FIG. 10 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a CE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 10, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 10.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 11:
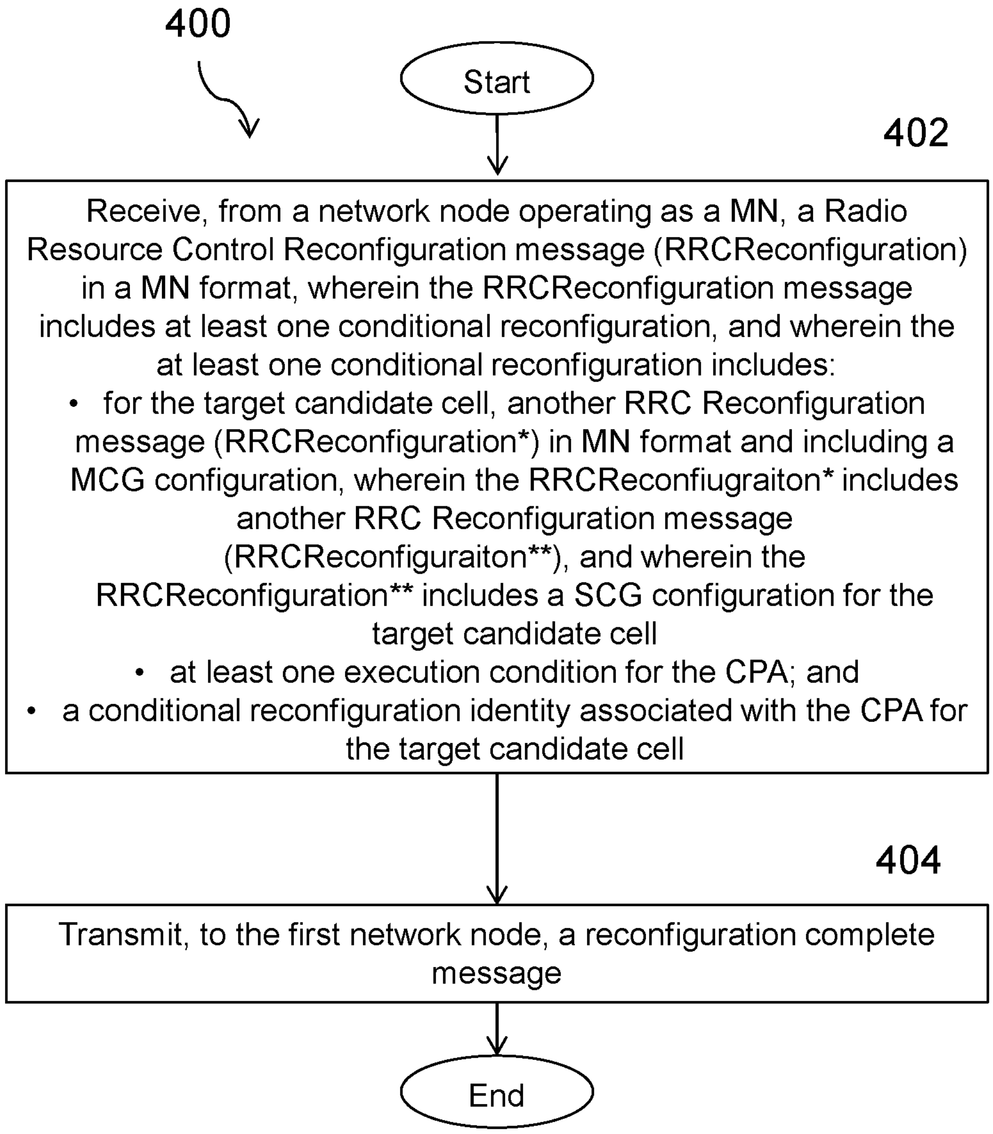
FIG. 11 illustrates an example method by a wireless device, according to certain embodiments.

FIG. 11 illustrates a method 400 performed by a wireless device 110 for CPA, according to certain embodiments. The method begins at step 402 when the wireless device 110 receives, from a network node 160 operating as a MN, an RRC Reconfiguration message (which is referred to herein as RRCReconfiguration) in a MN format. The RRCReconfiguration includes at least one conditional reconfiguration for the CPA. The conditional reconfiguration includes:

- for the target candidate cell, another RRC Reconfiguration message (which is referred to herein as RRCReconfiguration*) in MN format and a MCG configuration. The RRCReconfiguration* includes another RRC Reconfiguration message (which is referred to herein as RRCReconfiguration**), which includes a configuration for the target candidate cell;
- at least one execution condition for the CPA; and
- a conditional reconfiguration identity associated with the CPA for the target candidate cell.

At step 404, the wireless device 110 transmits, to the network node 160, a reconfiguration complete message.

In a particular embodiment, the wireless device 110 monitors at least one candidate cell for a fulfilment of the execution condition for the CPA. The at least one candidate cell has a physical cell identity matching a value indicated in an IE, ServingCellConfigCommon, included in an IE (ReconfigurationWithSync) in the RRCReconfiguration message. The RRCReconfiguration message is set in an IE (nr-SCG) in an IE (condRRCReconfig).

In a particular embodiment, the wireless device 110 applies the RRCReconfiguration*. The wireless device 110 also applies the RRCReconfiguration** for the target candidate SN upon a fulfilment of an execution condition for the target candidate cell.

In a particular embodiment, the wireless device 110 generates a first reconfiguration complete message (which is referred to herein as RRCReconfigurationComplete**) and a second reconfiguration complete message (which is referred to herein as RRCReconfigurationComplete*). The wireless device 110 sends the RRCReconfigurationComplete** and RRCReconfigurationComplete* messages to the first network node 160. The RRCReconfigurationComplete message indicates that the wireless device has applied the RRCReconfiguration generated by the target candidate SN, and the RRCReconfigurationComplete* message indicates that the wireless device has applied the RRCReconfiguration* and includes a cell identity or a conditional reconfiguration identity for the cell for which conditional reconfiguration has been executed. The RRCReconfigurationComplete** message is included within the RRCReconfigurationComplete* message.

In a particular embodiment, the wireless device 110 performs a random access procedure with the target candidate SN.

In a particular embodiment, the conditional reconfiguration for the CPA includes a measurement configuration associated with the conditional reconfiguration. The wireless device 110 applies the measurement configuration and sends a measurement report to the network node 160.

In a particular embodiment, the wireless device 110 is capable of operating in Multi-Radio Dual Connectivity.

In a particular embodiment, the conditional reconfiguration includes information for a plurality of target cells, each target cell having an associated RRCReconfiguration* and RRCReconfiguration**.

Figure 12:
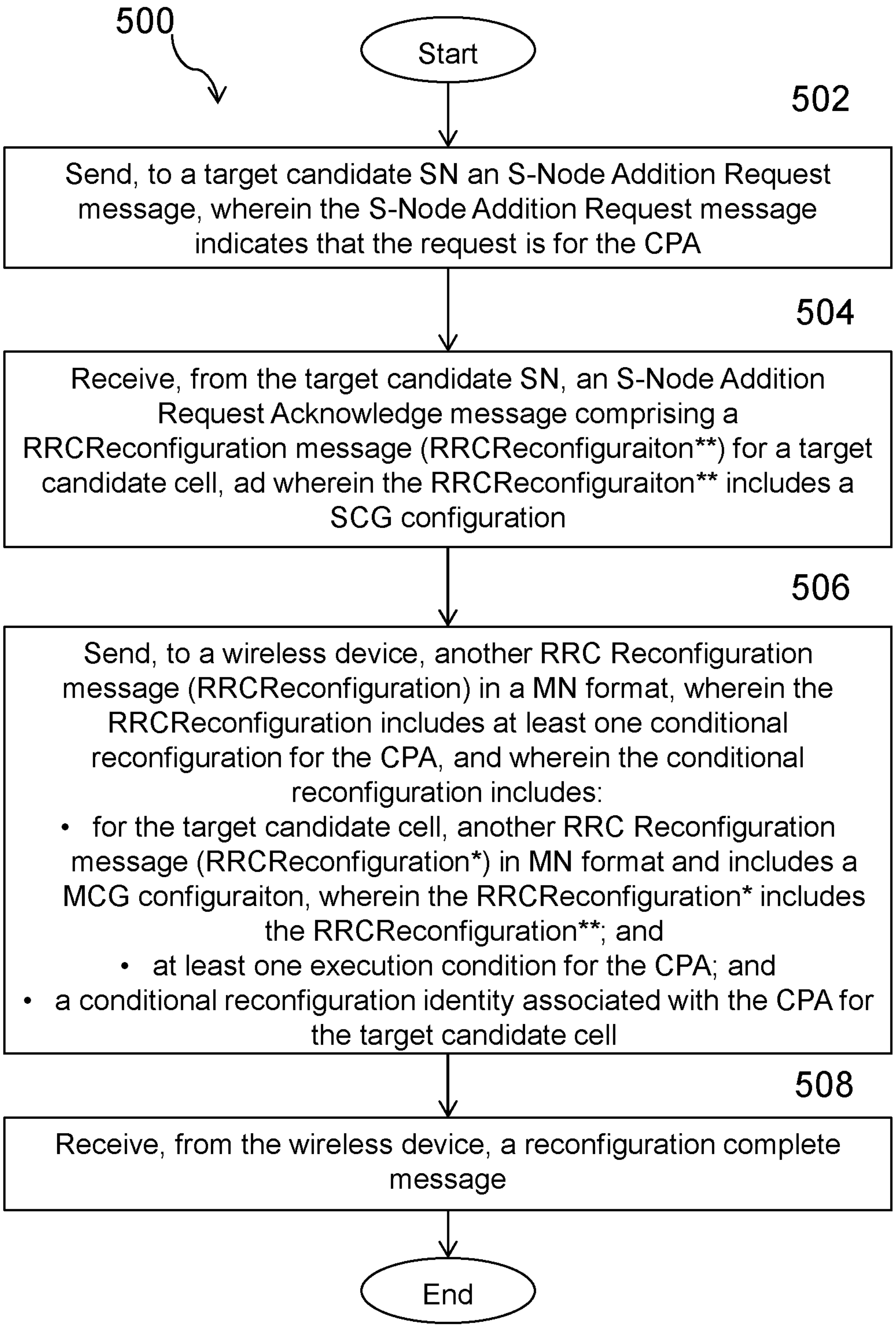
FIG. 12 illustrates an example method by a network node, according to certain embodiments.

FIG. 12 illustrates a method 500 performed by a network node 160 operating as a MN for CPA, according to certain embodiments. The method begins at step 502 when the network node 160 sends, to a target candidate SN an S-Node Addition Request message. The S-Node Addition Request message indicates that the request is for the CPA.

At step 504, the network node 160 receives, from the target candidate SN, an S-Node Addition Request Acknowledge message, which includes an RRC Reconfiguration message (which is referred to herein as RRCReconfiguration) for a target candidate cell. The RRCReconfiguration includes a SCG configuration.

At step 506, the network node 160 sends, to a wireless device 110, another RRC Reconfiguration message (which is referred to herein as RRCReconfiguration) in a MN format. The RRCReconfiguration includes at least one conditional reconfiguration for the CPA. The conditional reconfiguration includes:

- for the target candidate cell, another RRC Reconfiguration message (which is referred to herein as RRCReconfiguration*) in MN format and includes a MCG configuration:
- at least one execution condition for the CPA; and
- a conditional reconfiguration identity associated with the CPA for the target candidate cell.

The RRCReconfiguration* includes the RRCReconfiguration**.

At step 508, the network node 160 receives, from the wireless device, a first reconfiguration complete message.

In a particular embodiment, the network node 160 receives, from the wireless device 110, a second reconfiguration complete message (which is referred to herein as RRCReconfigurationComplete*), which another reconfiguration complete message (which is referred to herein as RRCReconfigurationComplete**). The RRCReconfigurationComplete* indicates that the wireless device has applied the RRCReconfiguration*, and the RRCReconfigurationComplete indicates that the wireless device has applied the RRCReconfiguration.

In a further particular embodiment, the RRCReconfigurationComplete* is in MN format, and the RRCReconfigurationComplete** in SN format.

In a further particular embodiment, in response to receiving the RRCReconfigurationComplete* message comprising the RRCReconfigurationComplete message from the wireless device 110, the network node 160 sends the RRCReconfigurationComplete message to the target candidate SN.

In a further particular embodiment, the conditional reconfiguration includes information for a plurality of target cells, and each target cell has an associated RRCReconfiguration* and RRCReconfiguration**.

In a further particular embodiment, the RRCReconfigurationComplete* includes:

a cell identity for one of the plurality of cells for which conditional reconfiguration has been executed; or a conditional reconfiguration identity for the one of the plurality of cells for which conditional reconfiguration has been executed.

In a further particular embodiment, the network node 160 maintains a mapping between the cell identity for the cell for which conditional reconfiguration has been executed and the target candidate SN ID of the target candidate SN that should receive the RRCReconfigurationComplete message. Alternatively, the network node 160 may maintain a mapping between the conditional reconfiguration identity and the target candidate SN ID of the target candidate SN that should receive the RRCReconfigurationComplete message.

In a further particular embodiment, in response to receiving, from the wireless device, the RRCReconfigurationComplete* message comprising the RRCReconfigurationComplete message and including either the cell identity for the cell for which conditional reconfiguration has been executed or a conditional reconfiguration identity associated to it, the network node 160 sends the RRCReconfigurationComplete message to the target candidate SN associated to the cell for which conditional reconfiguration has been executed.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

According to one example embodiment (referred to as "Option 1"), the Master Node (MN) determines to configure Conditional PSCell Addition (CPA). The MN includes an indication of conditional configuration (e.g., CPA indication) in an SN-NODE ADDITION REQUEST when the MN sends it to a target SN. The SN receiving the message, which can be considered as an SN candidate, generates an SCG RRC Reconfiguration (e.g., denoted RRCReconfiguration**) to be applied when an execution condition is fulfilled; and includes that in an SN-NODE ADDITION REQUEST ACKNOWLEDGE that is sent to the MN.

In a particular embodiment, the MN builds/generates an RRC message (in MN format) (e.g., RRCReconfiguration), to be sent to the UE, containing conditional reconfiguration and possibly including a measurement configuration associated to a conditional reconfiguration (e.g., CPA). The conditional reconfiguration for each target candidate includes at least one of the following:

A configuration for the associated execution condition, for example one or a number of measurement identifiers (e.g., 2 measurement identifiers) associated to a measurement configuration (e.g., an MCG measurement configuration); and Another RRC Reconfiguration message in MN format generated by the MN (e.g. RRCReconfiguration*), wherein that includes an SCG RRC Reconfiguration received from a Target candidate SN (e.g., provided as an nr-SCG set to RRCReconfiguration**, or equivalent in the case the SCG is from another RAT like E-UTRA). For example, the messages and information elements (IEs) could be nested as follows:

RRCReconfiguration (MN format), generated by MN:
  Conditional Reconfiguration;
    RRCReconfiguration* (MN format), generated by MN:
      nr-SCG set to RRCReconfiguration** (SN format), generated by SN (in fact, an SN candidate).

In summary, the RRC message (RRCReconfiguration in MN format) contains conditions set by the MN, and the conditional reconfiguration including per candidate: which is another RRC Reconfiguration in MN format (RRCReconfiguration*), where within there is an SCG configuration, for example an nr-SCG, as another RRC message built by the candidate SN (e.g., RRCReconfiguration**). The RRCReconfiguration* in MN format is the message applied by the UE upon fulfilment of the execution condition for a given target candidate; and, as that contains within an RRCReconfiguration** message in SN format, that is also applied upon fulfilment of the conditions. As both messages in MN and SN format are applied, the UE generates two complete messages upon CPC execution and transmits an RRCReconfigurationComplete* in MN format to MN, including within an RRCReconfigurationComplete** in SN format (that is then forwarded form the MN to the SN candidate for which CPA has been executed).

In certain embodiments, the MN sends the RRC message (RRCReconfiguration) with the conditional reconfiguration to the UE. The MN receives a first RRCReconfigurationComplete message when the UE is configured with CPA (without any SCG associated complete message) and, at CPA execution, a second RRC complete message (e.g. an RRCReconfigurationComplete* associated with the MN including within an SCG associated RRCReconfigurationComplete*), to be forwarded to the SN. The MN either: forwards the RRCReconfigurationComplete message to the target SN; or sends an S-NODE RECONFIGURATION COMPLETE to the target SN According to another example embodiment (referred to as "Option 2"), the MN decides to configure CPA, but the target candidate SN is the node that generates the conditional reconfiguration (i.e., that generates the SCG RRC Reconfiguration containing CPA configuration). The difference compared to Option 1 is that the SN builds an RRC message also containing the conditional reconfiguration which is part of the SCG RRC Reconfiguration (e.g., as set in the nr-SCG field) sent to the MN. That means that the SCG RRC Reconfiguration contains the conditions set by the SN and an SCG configuration built by the candidate SN, to be applied by the UE when the conditions are fulfilled. This difference also causes difference in the signalling flow regarding the complete messages.

According to another example embodiment for conditional PSCell Addition (referred to as "Option 3"), the SN is the node determining the execution conditions. In other words, the MN in the SN Addition Request would not need to provide the configurations of execution conditions, but that would be determined by the SN, and set by the SN in the CPA configuration to be provided to the UE.

According to certain embodiments, a method performed by a wireless device for conditional PSCell addition is disclosed. The method comprises receiving, from a first network node operating as a Master Node (MN), a Radio Resource Control Reconfiguration message (RRCReconfiguration), the RRCReconfiguration message including at least one conditional reconfiguration. The method comprises configuring the at least one conditional reconfiguration. The method comprises sending, to the first network node, a reconfiguration complete message.

In a particular embodiment, the RRCReconfiguration may be in MN format.

In a particular embodiment, the conditional reconfiguration may comprise: an RRCReconfiguration (RRCReconfiguration*) in MN format for a target candidate secondary node (SN); and at least one execution condition. In certain embodiments, the RRCReconfiguration* may comprise an RRC reconfiguration message generated by the target candidate SN (RRCReconfiguration**) in SN format.

In a particular embodiment, the method may comprise monitoring for the at least one execution condition. In certain embodiments, monitoring for the at least one execution condition may comprise—determining a cell to be monitored for the at least one execution condition based on a physical cell identity matching a value indicated in a ServingCellConfigCommon included in a reconfigurationWithSync in an nr-SCG receiving in the conditional reconfiguration.

In a particular embodiment, the method may comprise determining that the at least one execution condition has been fulfilled.

In a particular embodiment, the method may comprise applying the RRCReconfiguration*.

In a particular embodiment, the method may comprise applying the RRCReconfiguration** for the target candidate SN.

In a particular embodiment, the method may comprise: generating a first RRCReconfigurationComplete message (RRCReconfigurationComplete**); generating a second RRCReconfigurationComplete message (RRCReconfigurationComplete*); and sending the RRCReconfigurationComplete** and RRCReconfigurationComplete* messages to the first network node. In certain embodiments, the RRCReconfigurationComplete message may indicate that the wireless device has applied the RRCReconfiguration generated by the target candidate SN. In certain embodiments, the RRCReconfigurationComplete** message may be included within the RRCReconfigurationComplete* message.

In a particular embodiment, the method may comprise performing a random access procedure with the target candidate SN.

In a particular embodiment, the conditional reconfiguration may comprise a measurement configuration associated with the conditional reconfiguration.

In a particular embodiment, the method may comprise applying the measurement configuration.

In a particular embodiment, the method may comprise sending a measurement report to the first network node.

In a particular embodiment, the wireless device may be capable of operating in Multi-Radio Dual Connectivity.

In a particular embodiment, the method may comprise: providing user data; and forwarding the user data to a host computer via the transmission to the network node.

According to certain embodiments, a method performed by a first network node for conditional PSCell addition is disclosed. The first network node may be operating as a Master Node (MN) The method comprises determining to configure conditional PSCell addition for a wireless device. The method comprises generating an RRC Reconfiguration message (RRCReconfiguration) for the wireless device. The RRCReconfiguration message may comprise at least one conditional reconfiguration. The conditional reconfiguration may comprise: for a target candidate secondary node (SN), another RRC Reconfiguration in MN format (RRCReconfiguration*) generated by the MN, wherein the RRCReconfiguration* includes an RRC Reconfiguration generated by the target candidate SN (RRCReconfiguration**) in SN format; and an execution condition. The method comprises sending the generated RRC Reconfiguration message to the wireless device.

In a particular embodiment, the method may comprise: sending, to the target candidate SN, an S-Node Addition Request message, the S-Node Addition Request message indicating that the request is for conditional PSCell addition; and receiving, from the target candidate SN, an S-Node Addition Request Acknowledge message, the S-Node Addition Request Acknowledge message including the RRCReconfiguration** generated by the target candidate SN.

In a particular embodiment, the method may comprise receiving, from the wireless device, a reconfiguration complete message.

In a particular embodiment, the method may comprise receiving a first RRCReconfigurationComplete message (RRCReconfigurationComplete**) and a second RRCReconfigurationComplete message (RRCReconfigurationComplete*) from the wireless device. In certain embodiments, the RRCReconfigurationComplete message may indicate that the wireless device has applied the RRCReconfiguration generated by the target candidate SN. In certain embodiments, the RRCReconfigurationComplete** message may be included within the RRCReconfigurationComplete* message.

In a particular embodiment, the method may comprise in response to receiving the RRCReconfigurationComplete** and RRCReconfigurationComplete* messages from the wireless device, determining a target candidate SN to send a the RRCReconfigurationComplete** message.

In a particular embodiment, the method may comprise in response to receiving the RRCReconfigurationComplete** and RRCReconfigurationComplete* messages from the wireless device, sending a message to a source SN to confirm a release of source SN resources.

In a particular embodiment, the conditional reconfiguration may comprise information for a plurality of target cells, each target cell having an associated RRCReconfiguration* and RRCReconfiguration**.

In a particular embodiment, the S-Node Addition Request message may comprise information regarding one or more execution conditions to be considered by the target candidate SN.

In a particular embodiment, the S-Node Addition Request Acknowledge message may comprise the RRCReconfiguration*. In certain embodiments, the RRCReconfiguration* may comprise a conditional PSCell Addition configuration generated by the target candidate SN.

In a particular embodiment, the method may comprise: obtaining user data; and forwarding the user data to a host computer or the wireless device.

According to certain other embodiments, a method performed by a first network node for conditional PSCell addition is disclosed. The first network node may be operating as a target candidate Secondary Node (SN). The method comprises receiving, from a second network node operating as a Master Node (MN), an S-Node Addition Request message, the S-Node Addition Request message indicating that the request is for conditional PSCell addition. The method comprises sending, to the second network node operating as a MN, an S-Node Addition Request Acknowledge message, the S-Node Addition Request Acknowledge message including an RRC Reconfiguration message (RRCReconfiguration**) generated by the target candidate SN.

In a particular embodiment, the RRCReconfiguration** may be associated to at least one Secondary Cell Group (SCG).

In a particular embodiment, the RRCReconfiguration** message may comprise an SCG group configuration with a reconfigurationWithSync information element.

In a particular embodiment, the method may comprise receiving, form the second network node operating as a MN, an RRC Reconfiguration Complete message (RRCReconfigurationComplete**) generated by a wireless device.

In a particular embodiment, the S-Node Addition Request message may comprise information regarding one or more execution conditions to be considered by the first network node operating as a target candidate SN.

In a particular embodiment, the method may comprise determining one or more execution conditions.

In a particular embodiment, the S-Node Addition Request Acknowledge message may comprise an RRCReconfiguration Message (RRCReconfiguration*) comprising a conditional PSCell Addition configuration generated by the first network node operating as the target candidate SN.

In a particular embodiment, the conditional PSCell Addition configuration may comprise: one or more execution conditions; and the RRCReconfiguration** to be applied by the wireless device upon fulfilment of the condition.

In a particular embodiment, the RRCReconfiguration* may be included in a container that indicates to the second network node operating as an MN that the RRCReconfiguration* is to be provided to the wireless device.

In a particular embodiment, the method may comprise: obtaining user data; and forwarding the user data to a host computer or the wireless device.

According to certain embodiments, a wireless device includes processing circuitry configured to perform any of the steps of any of the embodiments above; and power supply circuitry configured to supply power to the wireless device.

According to certain embodiments, a network node includes processing circuitry configured to perform any of the steps of any of the embodiments above; power supply circuitry configured to supply power to the wireless device.

According to certain embodiments, a user equipment (UE), the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the embodiments above; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

According to certain embodiments, a communication system including a host computer comprising: processing circuitry configured to provide user data; and a communication interface configured to forward the user data to a cellular network for transmission to a user equipment (UE), wherein the cellular network comprises a network node having a radio interface and processing circuitry, the network node's processing circuitry configured to perform any of the steps of any of the embodiments above.

The communication system of the pervious embodiment further including the network node.

The communication system of the previous 2 embodiments, further including the UE, wherein the UE is configured to communicate with the network node.

The communication system of the previous 3 embodiments, wherein: the processing circuitry of the host computer is configured to execute a host application, thereby providing the user data; and the UE comprises processing circuitry configured to execute a client application associated with the host application.

According to certain embodiments, a method implemented in a communication system including a host computer, a network node and a user equipment (UF), the method comprising: at the host computer, providing user data; and at the host computer, initiating a transmission carrying the user data to the UE via a cellular network comprising the network node, wherein the network node performs any of the steps of any of the embodiments above.

The method of the previous embodiment, further comprising, at the network node, transmitting the user data.

The method of the previous 2 embodiments, wherein the user data is provided at the host computer by executing a host application, the method further comprising, at the UE, executing a client application associated with the host application.

A user equipment (UE) configured to communicate with a network node, the UE comprising a radio interface and processing circuitry configured to performs the of the previous 3 embodiments.

A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the embodiments above.

The communication system of the previous embodiment, wherein the cellular network further includes a network node configured to communicate with the UE.

The communication system of the previous 2 embodiments, wherein: the processing circuitry of the host computer is configured to execute a host application, thereby providing the user data; and the UE's processing circuitry is configured to execute a client application associated with the host application.

According to certain embodiments, a method implemented in a communication system including a host computer, a network node and a user equipment (UE), the method comprising: at the host computer, providing user data, and at the host computer, initiating a transmission carrying the user data to the UE via a cellular network comprising the network node, wherein the UE performs any of the steps of any of the embodiments above.

The method of the previous embodiment, further comprising at the UE, receiving the user data from the network node.

A communication system including a host computer comprising: communication interface configured to receive user data originating from a transmission from a user equipment (UE) to a network node, wherein the UE comprises a radio interface and processing circuitry, the UE's processing circuitry configured to perform any of the steps of any of the embodiments above.

The communication system of the previous embodiment, further including the UE.

The communication system of the previous 2 embodiments, further including the network node, wherein the network node comprises a radio interface configured to communicate with the UE and a communication interface configured to forward to the host computer the user data carried by a transmission from the UE to the network node.

The communication system of the previous 3 embodiments, wherein: the processing circuitry of the host computer is configured to execute a host application; and the UE's processing circuitry is configured to execute a client application associated with the host application, thereby providing the user data.

The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

A method implemented in a communication system including a host computer, a network node and a user equipment (UE), the method comprising: at the host computer, receiving user data transmitted to the network node from the UE, wherein the UE performs any of the steps of any of the embodiments above.

The method of the previous embodiment, further comprising, at the UE, providing the user data to the network node.

The method of the previous 2 embodiments, further comprising: at the UE, executing a client application, thereby providing the user data to be transmitted; and at the host computer, executing a host application associated with the client application.

The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

According to certain embodiments, a communication system including a host computer comprising a communication interface configured to receive user data originating from a transmission from a user equipment (UE) to a network node, wherein the network node comprises a radio interface and processing circuitry, the network node's processing circuitry configured to perform any of the steps of any of the embodiments above.

The communication system of the previous embodiment further including the network node.

The communication system of the previous 2 embodiments, further including the UE, wherein the UE is configured to communicate with the network node.

The communication system of the previous 3 embodiments, wherein: the processing circuitry of the host computer is configured to execute a host application; the UE is configured to execute a client application associated with the host application, thereby providing the user data to be received by the host computer.

According to certain embodiments, a method implemented in a communication system including a host computer, a network node and a user equipment (UE), the method comprising: at the host computer, receiving, from the network node, user data originating from a transmission which the network node has received from the UE, wherein the UE performs any of the steps of any of the embodiments above.

The method of the previous embodiment, further comprising at the network node, receiving the user data from the UE.

The method of the previous 2 embodiments, further comprising at the network node, initiating a transmission of the received user data to the host computer.

According to certain embodiments, a computer program, the program comprising instructions which when executed on a computer perform any one of the methods of the Group A embodiments.

According to certain embodiments, a computer program product comprising a computer program, the program comprising instructions which when executed on a computer perform any one of the methods of the Group A embodiments.

According to certain embodiments, a computer storage medium comprising a computer program, the program comprising instructions which when executed on a computer perform any of the methods of the Group A embodiments.

According to certain embodiments, a computer storage carrier comprising a computer program, the program comprising instructions which when executed on a computer perform any one of the methods of the Group A embodiments.

According to certain embodiments, a computer program, the program comprising instructions which when executed on a computer perform any one of the methods of the Group B embodiments.

According to certain embodiments, a computer program product comprising a computer program, the program comprising instructions which when executed on a computer perform any one of the methods of the Group B embodiments.

According to certain embodiments, a computer storage medium comprising a computer program, the program comprising instructions which when executed on a computer perform any of the methods of the Group B embodiments.

According to certain embodiments, a computer storage carrier comprising a computer program, the program comprising instructions which when executed on a computer perform any one or the methods of the Group B embodiments.

The invention claimed is:

1. A method performed by a network node for conditional Primary Secondary Cell Addition, CPA, the network node operating as a Master Node, MN, the method comprising:

sending, to a target candidate secondary node, SN, an S-Node Addition Request message, the S-Node Addition Request message indicating that the request is for the CPA;

receiving, from the target candidate SN, an S-Node Addition Request Acknowledge message comprising a Radio Resource Control, RRC, Reconfiguration message, RRCReconfiguration, for a target candidate cell, the RRCReconfiguration comprising a Secondary Cell Group, SCG, configuration;

sending, to a wireless device, another RRC Reconfiguration message, RRCReconfiguration, in a MN format, wherein the RRCReconfiguration comprises at least one conditional reconfiguration for the CPA, the conditional reconfiguration comprising:

for the target candidate cell, another RRC Reconfiguration message, RRCReconfiguration*, in MN format and including a Master Cell Group, MCG, configuration, wherein the RRCReconfiguration* includes the RRCReconfiguration**; and at least one execution condition for the CPA; and a conditional reconfiguration identity associated with the CPA for the target candidate cell;

and receiving, from the wireless device, a first reconfiguration complete message.

2. The method of claim 1, further comprising:

receiving, from the wireless device, a second reconfiguration complete message, RRCReconfigurationComplete*, wherein the RRCReconfigurationComplete* comprises a third reconfiguration complete message, RRCReconfigurationComplete**, and wherein:

the RRCReconfigurationComplete* indicates that the wireless device has applied the RRCReconfiguration*; and the RRCReconfigurationComplete indicates that the wireless device has applied the RRCReconfiguration.

3. The method of claim 2, wherein:

the RRCReconfigurationComplete* is in MN format, and the RRCReconfigurationComplete** in SN format.

4. A method performed by a wireless device for conditional Primary Secondary Cell Addition, CPA, the method comprising:

receiving, from a network node operating as a Master Node, MN, a Radio Resource Control, RRC, Reconfiguration message, RRCReconfiguration, in a MN format, wherein the RRCReconfiguration comprises at least one conditional reconfiguration for the CPA, the conditional reconfiguration comprising:

for the target candidate cell, another RRC Reconfiguration message, RRCReconfiguration*, in MN format and including a Master Cell Group (MCG) configuration, wherein the RRCReconfiguration* includes another RRC Reconfiguration message, RRCReconfiguration, wherein the RRCReconfiguration comprising a Secondary Cell Group (SCG) configuration for the target candidate cell; and at least one execution condition for the CPA;

information for a plurality of target cells, each target cell having an associated RRCReconfiguration* and RRCReconfiguration**; and a conditional reconfiguration identity associated with the CPA for the target candidate cell; and transmitting, to the network node, a reconfiguration complete message.

5. A network node for conditional Primary Secondary Cell Addition, CPA, the network node operating as a Master Node, MN, the network node comprising:

processing circuitry configured to:

send, to a target candidate secondary node, SN, an S-Node Addition Request message, the S-Node Addition Request message indicating that the request is for the CPA;

receive, from the target candidate SN, an S-Node Addition Request Acknowledge message comprising a Radio Resource Control, RRC, Reconfiguration message, RRCReconfiguration, for a target candidate cell, the RRCReconfiguration comprising a Secondary Cell Group, SCG, configuration;

send, to a wireless device, another RRC Reconfiguration message, RRCReconfiguration, in a MN format, wherein the RRCReconfiguration comprises at least one conditional reconfiguration for the CPA, the conditional reconfiguration comprising:

for the target candidate cell, another RRC Reconfiguration message, RRCReconfiguration*, in MN format and including a Master Cell Group (MCG) configuration, wherein the RRCReconfiguration* includes the RRCReconfiguration**;

at least one execution condition for the CPA; and a conditional reconfiguration identity associated with the CPA for the target candidate cell; and receive, from the wireless device, a first reconfiguration complete message.

6. The network node of claim 5, wherein the processing circuitry is configured to:

receive, from the wireless device, a second reconfiguration complete message, RRCReconfigurationComplete*, wherein the RRCReconfigurationComplete* comprises a third reconfiguration complete message, RRCReconfigurationComplete**, and wherein:

the RRCReconfigurationComplete* indicates that the wireless device has applied the RRCReconfiguration*; and the RRCReconfigurationComplete indicates that the wireless device has applied the RRCReconfiguration.

7. The network node of claim 6, wherein:

the RRCReconfigurationComplete* is in MN format, and the RRCReconfigurationComplete** in SN format.

8. The network node of claim 7, wherein the processing circuitry is configured to:

in response to receiving the RRCReconfigurationComplete* message comprising the RRCReconfigurationComplete message from the wireless device, send the RRCReconfigurationComplete message to the target candidate SN.

9. The network node of any one of claim 5, wherein the conditional reconfiguration comprises information for a plurality of target cells, each target cell having an associated RRCReconfiguration* and RRCReconfiguration**.

10. The network node of claim 9, wherein the RRCReconfigurationComplete* comprises at least one of:

a cell identity for one of the plurality of cells for which conditional reconfiguration has been executed; and a conditional reconfiguration identity for the one of the plurality of cells for which conditional reconfiguration has been executed.

11. The network node of claim 10, wherein the processing circuitry is configured to perform at least one of:

maintaining a mapping between the cell identity for the cell for which conditional reconfiguration has been executed and the target candidate SN ID of the target candidate SN that should receive the RRCReconfigurationComplete message, and maintaining a mapping between the conditional reconfiguration identity and the target candidate SN ID of the target candidate SN that should receive the RRCReconfigurationComplete message.

12. The method of claim 10, wherein the processing circuitry is configured to:

in response to receiving the RRCReconfigurationComplete* message comprising the RRCReconfigurationComplete message from the wireless device, send the RRCReconfigurationComplete message to the target candidate SN associated to the cell for which conditional reconfiguration has been executed.

13. A wireless device for conditional Primary Secondary Cell Addition, CPA, the wireless device comprising:

processing circuitry configured to:

receive, from a network node operating as a Master Node, MN, a Radio Resource Control, RRC, Reconfiguration message, RRCReconfiguration, in a MN format, wherein the RRCReconfiguration comprises at least one conditional reconfiguration for the CPA, the conditional reconfiguration comprising:

for the target candidate cell, another RRC Reconfiguration message, RRCReconfiguration*, in MN format and including a Master Cell Group, MCG, configuration, wherein the RRCReconfiguration* includes another RRC Reconfiguration message, RRCReconfiguration, wherein the RRCReconfiguration comprising a Secondary Cell Group, SCG, configuration for a target candidate cell; and at least one execution condition for the CPA;

information for a plurality of target cells, each target cell having an associated RRCReconfiguration* and RRCReconfiguration**; and a conditional reconfiguration identity associated with the CPA for the target candidate cell; and transmit, to the network node, a reconfiguration complete message.

14. The wireless device of claim 13, wherein the processing circuitry is configured to:

monitor at least one candidate cell for a fulfilment of the execution condition for the CPA, wherein the at least one candidate cell has a physical cell identity matching a value indicated in an Information Element, IE, ServingCellConfigCommon, included in an IE ReconfigurationWithSync in the RRCReconfiguration message, and wherein the RRCReconfiguration message is set in an IE, nr-SCG, in an IE, condRRCReconfig.

15. The wireless device of claim 13, wherein the processing circuitry is configured to:

apply the RRCReconfiguration*, and apply the RRCReconfiguration** for a target candidate SN upon a fulfilment of an execution condition for the target candidate cell.

16. The wireless device of claim 13, wherein the processing circuitry is configured to:

generate a first reconfiguration complete message, RRCReconfigurationComplete**;

generate a second reconfiguration complete message, RRCReconfigurationComplete*; and send the RRCReconfigurationComplete** and RRCReconfigurationComplete* messages to the first network node, and wherein the RRCReconfigurationComplete message indicates that the wireless device has applied the RRCReconfiguration generated by the target candidate SN, and wherein the RRCReconfigurationComplete* message indicates that the wireless device has applied the RRCReconfiguration* and includes a cell identity or a conditional reconfiguration identity for the cell for which conditional reconfiguration has been executed, and wherein the RRCReconfigurationComplete** message is included within the RRCReconfigurationComplete* message.

17. The wireless device of claim 13, wherein the processing circuitry is configured to:

perform a random access procedure with the target candidate SN.

18. The wireless device of claim 13, wherein the conditional reconfiguration for the CPA comprises a measurement configuration associated with the conditional reconfiguration, and wherein the processing circuitry is configured to:

apply the measurement configuration; and send a measurement report to the network node.

19. The wireless device of claim 13, wherein the wireless device is capable of operating in Multi-Radio Dual Connectivity.

* * * * *